(12) United States Patent
Pliefke et al.

(10) Patent No.: US 9,558,409 B2
(45) Date of Patent: Jan. 31, 2017

(54) VEHICLE VISION SYSTEM WITH TRAILER ANGLE DETECTION

(71) Applicant: MAGNA ELECTRONICS INC., Auburn Hills, MI (US)

(72) Inventors: Sebastian Pliefke, Sailauf (DE); Paul Jarmola, Köln (DE); Thomas Wierich, Butzbach (DE); Steven V. Byrne, Goodrich, MI (US); Yuesheng Lu, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 451 days.

(21) Appl. No.: 14/102,981

(22) Filed: Dec. 11, 2013

(65) Prior Publication Data

US 2014/0160276 A1 Jun. 12, 2014

Related U.S. Application Data

(63) Continuation-in-part of application No. 14/036,723, filed on Sep. 25, 2013, now Pat. No. 9,446,713.
(Continued)

(51) Int. Cl.
*G06K 9/00* (2006.01)
*B60R 1/00* (2006.01)
(Continued)

(52) U.S. Cl.
CPC .......... *G06K 9/00791* (2013.01); *B60R 1/00* (2013.01); *B62D 13/06* (2013.01);
(Continued)

(58) Field of Classification Search
CPC ............. B60R 1/00; B60R 1/003; G06K 9/00; G06K 9/00791
See application file for complete search history.

(56) References Cited

U.S. PATENT DOCUMENTS 4,200,361 A 4/1980 Malvano
4,214,266 A 7/1980 Myers
(Continued)

FOREIGN PATENT DOCUMENTS

DE 102009046676 5/2011
JP 59114139 7/1984
(Continued)

OTHER PUBLICATIONS

Borenstein et al., "Where am I? Sensors and Method for Mobile Robot Positioning", University of Michigan, Apr. 1996, pp. 2, 125-128.
(Continued)

*Primary Examiner* — Jay Patel
*Assistant Examiner* — Irfan Habib
(74) *Attorney, Agent, or Firm* — Gardner, Linn, Burkhart & Flory, LLP

(57) ABSTRACT

A vehicular vision system includes at least one camera and an image processor. The camera is disposed at a vehicle and has an exterior field of view rearward of the vehicle. The camera is operable to capture image data. The image processor is operable to process captured image data. The vision system, responsive at least in part to image processing of captured image data, is operable to determine a trailer angle of a trailer that is towed by the vehicle. The vision system is operable to determine a path of the trailer responsive to a steering angle of the vehicle and the vision system is operable to display information for viewing by the driver to assist the driver in driving the vehicle with the trailer.

20 Claims, 24 Drawing Sheets

Related U.S. Application Data

(60) Provisional application No. 61/736,104, filed on Dec. 12, 2012, provisional application No. 61/868,843, filed on Aug. 22, 2013, provisional application No. 61/834,128, filed on Jun. 12, 2013, provisional application No. 61/758,537, filed on Jan. 30, 2013, provisional application No. 61/705,877, filed on Sep. 26, 2012.

(51) Int. Cl.
*B62D 13/06* (2006.01)
*B62D 15/02* (2006.01)

(52) U.S. Cl.
CPC .... *B62D 15/0295* (2013.01); *B60R 2300/105* (2013.01); *B60R 2300/307* (2013.01); *B60R 2300/607* (2013.01); *B60R 2300/80* (2013.01)

(56) References Cited

U.S. PATENT DOCUMENTS

| | | |
|---|---|---|
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith |
| 4,731,669 A | 3/1988 | Hayashi et al. |
| 4,741,603 A | 5/1988 | Miyagi |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,855,822 A | 8/1989 | Narendra et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi et al. |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |

(56) References Cited

U.S. PATENT DOCUMENTS

| | | | |
|---|---|---|---|
| 5,374,852 A | 12/1994 | Parkes | |
| 5,386,285 A | 1/1995 | Asayama | |
| 5,394,333 A | 2/1995 | Kao | |
| 5,406,395 A | 4/1995 | Wilson et al. | |
| 5,410,346 A | 4/1995 | Saneyoshi et al. | |
| 5,414,257 A | 5/1995 | Stanton | |
| 5,414,461 A | 5/1995 | Kishi et al. | |
| 5,416,313 A | 5/1995 | Larson et al. | |
| 5,416,318 A | 5/1995 | Hegyi | |
| 5,416,478 A | 5/1995 | Morinaga | |
| 5,424,952 A | 6/1995 | Asayama | |
| 5,426,294 A | 6/1995 | Kobayashi et al. | |
| 5,430,431 A | 7/1995 | Nelson | |
| 5,434,407 A | 7/1995 | Bauer et al. | |
| 5,440,428 A | 8/1995 | Hegg et al. | |
| 5,444,478 A | 8/1995 | Lelong et al. | |
| 5,451,822 A | 9/1995 | Bechtel et al. | |
| 5,457,493 A | 10/1995 | Leddy et al. | |
| 5,461,357 A | 10/1995 | Yoshioka et al. | |
| 5,461,361 A | 10/1995 | Moore | |
| 5,469,298 A | 11/1995 | Suman et al. | |
| 5,471,515 A | 11/1995 | Fossum et al. | |
| 5,475,494 A | 12/1995 | Nishida et al. | |
| 5,487,116 A | 1/1996 | Nakano et al. | |
| 5,498,866 A | 3/1996 | Bendicks et al. | |
| 5,500,766 A | 3/1996 | Stonecypher | |
| 5,510,983 A | 4/1996 | Iino | |
| 5,515,448 A | 5/1996 | Nishitani | |
| 5,517,419 A * | 5/1996 | Lanckton | G01C 11/02 348/148 |
| 5,521,633 A | 5/1996 | Nakajima et al. | |
| 5,528,698 A | 6/1996 | Kamei et al. | |
| 5,529,138 A | 6/1996 | Shaw et al. | |
| 5,530,240 A | 6/1996 | Larson et al. | |
| 5,530,420 A | 6/1996 | Tsuchiya et al. | |
| 5,535,314 A | 7/1996 | Alves et al. | |
| 5,537,003 A | 7/1996 | Bechtel et al. | |
| 5,539,397 A | 7/1996 | Asanuma et al. | |
| 5,541,590 A | 7/1996 | Nishio | |
| 5,550,677 A | 8/1996 | Schofield et al. | |
| 5,555,312 A | 9/1996 | Shima et al. | |
| 5,555,555 A | 9/1996 | Sato et al. | |
| 5,568,027 A | 10/1996 | Teder | |
| 5,574,443 A | 11/1996 | Hsieh | |
| 5,581,464 A | 12/1996 | Woll et al. | |
| 5,594,222 A | 1/1997 | Caldwell | |
| 5,614,788 A | 3/1997 | Mullins | |
| 5,619,370 A | 4/1997 | Guinosso | |
| 5,634,709 A | 6/1997 | Iwama | |
| 5,642,299 A | 6/1997 | Hardin et al. | |
| 5,648,835 A | 7/1997 | Uzawa | |
| 5,650,764 A | 7/1997 | McCullough | |
| 5,650,944 A | 7/1997 | Kise | |
| 5,660,454 A | 8/1997 | Mori et al. | |
| 5,661,303 A | 8/1997 | Teder | |
| 5,666,028 A | 9/1997 | Bechtel et al. | |
| 5,668,663 A | 9/1997 | Varaprasad et al. | |
| 5,670,935 A * | 9/1997 | Schofield | B60N 2/002 340/435 |
| 5,675,489 A | 10/1997 | Pomerleau | |
| 5,677,851 A | 10/1997 | Kingdon et al. | |
| 5,699,044 A | 12/1997 | Van Lente et al. | |
| 5,724,187 A | 3/1998 | Varaprasad et al. | |
| 5,724,316 A | 3/1998 | Brunts | |
| 5,737,226 A | 4/1998 | Olson et al. | |
| 5,757,949 A | 5/1998 | Kinoshita et al. | |
| 5,760,826 A | 6/1998 | Nayer | |
| 5,760,828 A | 6/1998 | Cortes | |
| 5,760,931 A | 6/1998 | Saburi et al. | |
| 5,760,962 A | 6/1998 | Schofield et al. | |
| 5,761,094 A | 6/1998 | Olson et al. | |
| 5,765,116 A | 6/1998 | Wilson-Jones et al. | |
| 5,781,437 A | 7/1998 | Wiemer et al. | |
| 5,786,772 A | 7/1998 | Schofield et al. | |
| 5,790,403 A | 8/1998 | Nakayama | |
| 5,790,973 A | 8/1998 | Blaker et al. | |
| 5,793,308 A | 8/1998 | Rosinski et al. | |
| 5,793,420 A | 8/1998 | Schmidt | |
| 5,796,094 A | 8/1998 | Schofield et al. | |
| 5,798,575 A | 8/1998 | O'Farrell et al. | |
| 5,835,255 A | 11/1998 | Miles | |
| 5,837,994 A * | 11/1998 | Stam | B60Q 1/085 250/208.1 |
| 5,844,505 A | 12/1998 | Van Ryzin | |
| 5,844,682 A | 12/1998 | Kiyomoto et al. | |
| 5,845,000 A | 12/1998 | Breed et al. | |
| 5,848,802 A | 12/1998 | Breed et al. | |
| 5,850,176 A | 12/1998 | Kinoshita et al. | |
| 5,850,254 A | 12/1998 | Takano et al. | |
| 5,861,814 A | 1/1999 | Clayton | |
| 5,867,591 A | 2/1999 | Onda | |
| 5,877,707 A | 3/1999 | Kowalick | |
| 5,877,897 A | 3/1999 | Schofield et al. | |
| 5,878,370 A | 3/1999 | Olson | |
| 5,883,739 A | 3/1999 | Ashihara et al. | |
| 5,884,212 A | 3/1999 | Lion | |
| 5,890,021 A | 3/1999 | Onoda | |
| 5,896,085 A | 4/1999 | Mori et al. | |
| 5,899,956 A | 5/1999 | Chan | |
| 5,914,815 A | 6/1999 | Bos | |
| 5,923,027 A | 7/1999 | Stam et al. | |
| 5,929,786 A | 7/1999 | Schofield et al. | |
| 5,940,120 A | 8/1999 | Frankhouse et al. | |
| 5,949,331 A | 9/1999 | Schofield et al. | |
| 5,956,181 A | 9/1999 | Lin | |
| 5,959,367 A | 9/1999 | O'Farrell et al. | |
| 5,959,555 A | 9/1999 | Furuta | |
| 5,963,247 A | 10/1999 | Banitt | |
| 5,964,822 A | 10/1999 | Alland et al. | |
| 5,971,552 A | 10/1999 | O'Farrell et al. | |
| 5,986,796 A | 11/1999 | Miles | |
| 5,990,469 A | 11/1999 | Bechtel et al. | |
| 5,990,649 A | 11/1999 | Nagao et al. | |
| 6,001,486 A | 12/1999 | Varaprasad et al. | |
| 6,009,336 A | 12/1999 | Harris et al. | |
| 6,020,704 A | 2/2000 | Buschur | |
| 6,049,171 A * | 4/2000 | Stam | B60Q 1/085 250/208.1 |
| 6,066,933 A | 5/2000 | Ponziana | |
| 6,084,519 A | 7/2000 | Coulling et al. | |
| 6,087,953 A | 7/2000 | DeLine et al. | |
| 6,097,023 A | 8/2000 | Schofield et al. | |
| 6,097,024 A | 8/2000 | Stam et al. | |
| 6,116,743 A | 9/2000 | Hoek | |
| 6,124,647 A | 9/2000 | Marcus et al. | |
| 6,124,886 A | 9/2000 | DeLine et al. | |
| 6,139,172 A | 10/2000 | Bos et al. | |
| 6,144,022 A | 11/2000 | Tenenbaum et al. | |
| 6,172,613 B1 | 1/2001 | DeLine et al. | |
| 6,175,164 B1 | 1/2001 | O'Farrell et al. | |
| 6,175,300 B1 | 1/2001 | Kendrick | |
| 6,176,505 B1 | 1/2001 | Capik et al. | |
| 6,198,409 B1 | 3/2001 | Schofield et al. | |
| 6,201,642 B1 | 3/2001 | Bos | |
| 6,222,447 B1 | 4/2001 | Schofield et al. | |
| 6,222,460 B1 | 4/2001 | DeLine et al. | |
| 6,243,003 B1 | 6/2001 | DeLine et al. | |
| 6,250,148 B1 | 6/2001 | Lynam | |
| 6,259,412 B1 | 7/2001 | Duroux | |
| 6,266,082 B1 | 7/2001 | Yonezawa et al. | |
| 6,266,442 B1 | 7/2001 | Laumeyer et al. | |
| 6,285,393 B1 | 9/2001 | Shimoura et al. | |
| 6,291,906 B1 | 9/2001 | Marcus et al. | |
| 6,294,989 B1 | 9/2001 | Schofield et al. | |
| 6,297,781 B1 | 10/2001 | Turnbull et al. | |
| 6,302,545 B1 | 10/2001 | Schofield et al. | |
| 6,310,611 B1 | 10/2001 | Caldwell | |
| 6,313,454 B1 | 11/2001 | Bos et al. | |
| 6,317,057 B1 | 11/2001 | Lee | |
| 6,320,176 B1 | 11/2001 | Schofield et al. | |
| 6,320,282 B1 | 11/2001 | Caldwell | |
| 6,326,613 B1 | 12/2001 | Heslin et al. | |
| 6,329,925 B1 | 12/2001 | Skiver et al. | |
| 6,333,759 B1 | 12/2001 | Mazzilli | |

(56) References Cited

U.S. PATENT DOCUMENTS

| | | |
|---|---|---|
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B2 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,442,465 B2 | 8/2002 | Breed et al. |
| 6,477,464 B2 | 11/2002 | McCarthy et al. |
| 6,480,104 B1 | 11/2002 | Wall et al. |
| 6,483,429 B1 | 11/2002 | Yasui et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,559,761 B1 | 5/2003 | Miller et al. |
| 6,574,033 B1 | 6/2003 | Chui et al. |
| 6,578,017 B1 | 6/2003 | Ebersole et al. |
| 6,587,573 B1 * | 7/2003 | Stam .................. B60Q 1/085 340/930 |
| 6,589,625 B1 | 7/2003 | Kothari et al. |
| 6,593,565 B2 | 7/2003 | Heslin et al. |
| 6,594,583 B2 | 7/2003 | Ogura et al. |
| 6,611,202 B2 | 8/2003 | Schofield et al. |
| 6,611,610 B1 * | 8/2003 | Stam .................. B60Q 1/085 340/930 |
| 6,612,394 B2 * | 9/2003 | Wessman ............ B60T 8/1755 180/446 |
| 6,627,918 B2 | 9/2003 | Getz et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,693,524 B1 * | 2/2004 | Payne .................. B60Q 9/005 340/431 |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,721,659 B2 | 4/2004 | Stopczynski |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,801,125 B1 * | 10/2004 | McGregor ........... B62D 15/029 180/168 |
| 6,802,617 B2 | 10/2004 | Schofield et al. |
| 6,806,452 B2 | 10/2004 | Bos et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,847,487 B2 | 1/2005 | Burgner |
| 6,882,287 B2 | 4/2005 | Schofield |
| 6,889,161 B2 | 5/2005 | Winner et al. |
| 6,891,563 B2 * | 5/2005 | Schofield .................. B60R 1/00 348/143 |
| 6,909,753 B2 | 6/2005 | Meehan et al. |
| 6,946,978 B2 | 9/2005 | Schofield |
| 6,953,253 B2 | 10/2005 | Schofield et al. |
| 6,956,468 B2 * | 10/2005 | Lee ....................... B60D 1/305 280/504 |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,005,974 B2 | 2/2006 | McMahon et al. |
| 7,006,127 B2 | 2/2006 | Mizusawa et al. |
| 7,038,577 B2 | 5/2006 | Pawlicki et al. |
| 7,046,448 B2 | 5/2006 | Burgner |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,158,015 B2 | 1/2007 | Rao et al. |
| 7,167,796 B2 | 1/2007 | Taylor et al. |
| 7,195,381 B2 | 3/2007 | Lynam et al. |
| 7,202,776 B2 | 4/2007 | Breed |
| 7,224,324 B2 | 5/2007 | Quist et al. |
| 7,227,459 B2 | 6/2007 | Bos et al. |
| 7,227,611 B2 | 6/2007 | Hull et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,360,932 B2 | 4/2008 | Uken et al. |
| 7,370,983 B2 | 5/2008 | DeWind et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,425,889 B2 * | 9/2008 | Widmann ............... B60R 1/003 340/425.5 |
| 7,459,664 B2 | 12/2008 | Schofield et al. |
| 7,483,058 B1 | 1/2009 | Frank et al. |
| 7,526,103 B2 | 4/2009 | Schofield et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,616,781 B2 | 11/2009 | Schofield et al. |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,690,737 B2 * | 4/2010 | Lu .............................. B60T 7/12 303/146 |
| 7,720,580 B2 * | 5/2010 | Higgins-Luthman ..... B60R 1/00 250/208.1 |
| 7,792,329 B2 | 9/2010 | Schofield et al. |
| 7,843,451 B2 | 11/2010 | Lafon |
| 7,855,778 B2 | 12/2010 | Yung et al. |
| 7,859,565 B2 | 12/2010 | Schofield et al. |
| 7,881,496 B2 * | 2/2011 | Camilleri ................. B60R 1/00 340/904 |
| 7,914,187 B2 | 3/2011 | Higgins-Luthman et al. |

(56) References Cited

U.S. PATENT DOCUMENTS

| | | | |
|---|---|---|---|
| 7,930,160 B1 | 4/2011 | Hosagrahara et al. | |
| 8,010,252 B2* | 8/2011 | Getman | B60T 8/1755 280/432 |
| 8,017,898 B2 | 9/2011 | Lu et al. | |
| 8,038,166 B1* | 10/2011 | Piesinger | B60D 1/06 280/477 |
| 8,063,752 B2 | 11/2011 | Oleg | |
| 8,094,170 B2 | 1/2012 | Kato et al. | |
| 8,095,310 B2 | 1/2012 | Taylor et al. | |
| 8,098,142 B2 | 1/2012 | Schofield et al. | |
| 8,164,628 B2 | 4/2012 | Stein et al. | |
| 8,218,007 B2 | 7/2012 | Lee et al. | |
| 8,224,031 B2 | 7/2012 | Saito | |
| 8,260,518 B2* | 9/2012 | Englert | B60D 1/30 303/123 |
| 8,411,998 B2 | 4/2013 | Huggett et al. | |
| 8,755,984 B2 | 6/2014 | Rupp | |
| 8,838,353 B2* | 9/2014 | Wu | B60D 1/245 180/14.1 |
| 8,909,426 B2* | 12/2014 | Rhode | B62D 1/22 280/426 |
| 9,085,261 B2* | 7/2015 | Lu | |
| 9,102,272 B2* | 8/2015 | Trombley | B60R 1/00 |
| 9,126,525 B2* | 9/2015 | Lynam | |
| 9,233,710 B2* | 1/2016 | Lavoie | B62D 13/06 |
| 9,264,672 B2* | 2/2016 | Lynam | B60R 1/00 |
| 9,283,892 B2* | 3/2016 | Trombley | B60R 1/00 |
| 9,315,212 B1* | 4/2016 | Kyrtsos | B62D 13/06 |
| 9,335,162 B2* | 5/2016 | Kyrtsos | G01B 21/02 |
| 9,446,713 B2* | 9/2016 | Lu | B60R 1/002 |
| 2001/0001563 A1 | 5/2001 | Tomaszewski | |
| 2002/0113873 A1 | 8/2002 | Williams | |
| 2002/0145662 A1 | 10/2002 | Mizusawa | |
| 2002/0145663 A1 | 10/2002 | Mizusawa | |
| 2002/0149673 A1 | 10/2002 | Hirama | |
| 2003/0133014 A1* | 7/2003 | Mendoza | B60R 1/00 348/148 |
| 2003/0137586 A1* | 7/2003 | Lewellen | H04N 7/181 348/148 |
| 2003/0222982 A1 | 12/2003 | Hamdan et al. | |
| 2003/0234512 A1* | 12/2003 | Holub | B60D 1/36 280/432 |
| 2004/0130441 A1* | 7/2004 | Lee | B60D 1/58 340/431 |
| 2005/0000738 A1* | 1/2005 | Gehring | B62D 15/0285 180/14.1 |
| 2005/0074143 A1* | 4/2005 | Kawai | B60D 1/36 382/104 |
| 2005/0206225 A1* | 9/2005 | Offerle | B60T 8/1706 303/7 |
| 2005/0219852 A1 | 10/2005 | Stam et al. | |
| 2005/0236894 A1* | 10/2005 | Lu | B60T 8/1755 303/139 |
| 2005/0236896 A1* | 10/2005 | Offerle | B60T 8/1755 303/146 |
| 2005/0237385 A1* | 10/2005 | Kosaka | G01B 11/00 348/42 |
| 2006/0018511 A1 | 1/2006 | Stam et al. | |
| 2006/0018512 A1 | 1/2006 | Stam et al. | |
| 2006/0050018 A1* | 3/2006 | Hutzel | B60K 35/00 345/60 |
| 2006/0091813 A1 | 5/2006 | Stam et al. | |
| 2006/0098094 A1 | 5/2006 | Lott | |
| 2006/0103727 A1* | 5/2006 | Tseng | B60R 1/00 348/148 |
| 2006/0152351 A1* | 7/2006 | Daura Luna | B60Q 9/005 340/435 |
| 2006/0244579 A1* | 11/2006 | Raab | B60T 8/1708 340/438 |
| 2006/0250501 A1 | 11/2006 | Wildmann et al. | |
| 2007/0104476 A1 | 5/2007 | Yasutomi et al. | |
| 2007/0109406 A1 | 5/2007 | Schofield et al. | |
| 2007/0120657 A1 | 5/2007 | Schofield et al. | |
| 2007/0242339 A1 | 10/2007 | Bradley | |
| 2008/0147321 A1 | 6/2008 | Howard et al. | |
| 2008/0158357 A1 | 7/2008 | Connell | |
| 2008/0192132 A1 | 8/2008 | Bechtel et al. | |
| 2008/0231701 A1* | 9/2008 | Greenwood | B60R 1/00 348/148 |
| 2009/0005932 A1* | 1/2009 | Lee | B60D 1/58 701/41 |
| 2009/0045924 A1* | 2/2009 | Roberts, Sr. | G06F 17/00 340/10.41 |
| 2009/0113509 A1 | 4/2009 | Tseng et al. | |
| 2009/0143967 A1 | 6/2009 | Lee et al. | |
| 2009/0160987 A1 | 6/2009 | Bechtel et al. | |
| 2009/0190015 A1 | 7/2009 | Bechtel et al. | |
| 2009/0256938 A1 | 10/2009 | Bechtel et al. | |
| 2010/0097519 A1 | 4/2010 | Byrne | |
| 2011/0050903 A1* | 3/2011 | Vorobiev | A01B 69/003 348/148 |
| 2012/0045112 A1* | 2/2012 | Lundblad | G07D 7/162 382/135 |
| 2012/0200706 A1* | 8/2012 | Greenwood | B60R 1/00 348/148 |
| 2012/0265416 A1* | 10/2012 | Lu | B60R 1/00 701/70 |
| 2014/0085472 A1 | 3/2014 | Lu et al. | |
| 2014/0160276 A1* | 6/2014 | Pliefke | B60R 1/00 348/118 |
| 2014/0200759 A1* | 7/2014 | Lu | B60D 1/245 701/28 |
| 2014/0218506 A1* | 8/2014 | Trombley | B60R 1/003 348/113 |
| 2014/0249691 A1* | 9/2014 | Hafner | B62D 13/06 701/1 |
| 2014/0277942 A1* | 9/2014 | Kyrtsos | G01B 21/02 701/41 |
| 2014/0303849 A1* | 10/2014 | Hafner | B62D 13/06 701/42 |
| 2014/0343793 A1* | 11/2014 | Lavoie | B62D 13/06 701/41 |
| 2015/0002670 A1* | 1/2015 | Bajpai | G06K 9/00791 348/148 |

FOREIGN PATENT DOCUMENTS

| | | |
|---|---|---|
| JP | 6080953 | 5/1985 |
| JP | 6414700 | 1/1989 |
| JP | 4114587 | 4/1992 |
| JP | 05050883 | 3/1993 |
| JP | 6227318 | 8/1994 |
| JP | 0769125 | 3/1995 |
| JP | 07105496 | 4/1995 |
| JP | 2630604 | 7/1997 |
| JP | 2003083742 | 3/2003 |
| WO | WO2011/014497 | 2/2011 |
| WO | WO2012/103193 | 8/2012 |

OTHER PUBLICATIONS

Bow, Sing T., "Pattern Recognition and Image Preprocessing (Signal Processing and Communications)", CRC Press, Jan. 15, 2002, pp. 557-559.

Vlacic et al., (Eds), "Intelligent Vehicle Technologies, Theory and Applications", Society of Automotive Engineers Inc., edited by SAE International, 2001.

Van Leuven et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

(56) References Cited

OTHER PUBLICATIONS

Pratt, "Digital Image Processing, Passage—ED.3", John Wiley & Sons, US, Jan. 1, 2001, pp. 657-659, XP002529771.

* cited by examiner

Barker code of length seven:
+1 +1 +1 -1 -1 +1 -1

| required driving license class | trailer [kg] | car[kg] | trailer and car together[kg] |
|---|---|---|---|
| B | <750 | <3500 | d. c. |
| B | d. c. | d. c. | <3500 |
| BE | >750 | d. c. | d. c. |
| B96 | >750 | d. c. | <4250 |

TABLE 1

FIG. 24

VEHICLE VISION SYSTEM WITH TRAILER ANGLE DETECTION

CROSS REFERENCE TO RELATED APPLICATIONS

The present application claims the filing benefits of U.S. provisional application Ser. No. 61/736,104, filed Dec. 12, 2012, which is hereby incorporated herein by reference in its entirety. The present application is also a continuation-in-part of U.S. patent application Ser. No. 14/036,723, filed Sep. 25, 2013, which claims the filing benefits of U.S. provisional applications, Ser. No. 61/868,843, filed Aug. 22, 2013; Ser. No. 61/834,128, filed Jun. 12, 2013; Ser. No. 61/758,537, filed Jan. 30, 2013; and Ser. No. 61/705,877, filed Sep. 26, 2012, which are hereby incorporated herein by reference in their entireties.

FIELD OF THE INVENTION

The present invention relates to vehicles with cameras mounted thereon and in particular to vehicles with one or more exterior-facing cameras, such as rearward facing cameras and/or the like.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a camera for a vision system that utilizes one or more cameras or image sensors to capture image data of a scene exterior (such as forwardly) of a vehicle and provides a display of images indicative of or representative of the captured image data.

The vehicular vision system of the present invention includes at least one camera disposed at a vehicle and having an exterior field of view rearward of the vehicle. The camera is operable to capture image data. An image processor operable to process captured image data. The vision system is operable to determine a trailer angle of a trailer that is towed by the vehicle, and the vision system is operable to determine a path of the trailer responsive to a steering angle of the vehicle. The vision system is operable to display information for viewing by the driver to assist the driver in driving the vehicle with the trailer.

The vision system may display images of a road in the direction of travel of the vehicle and trailer and may display an overlay to indicate to the driver of the vehicle a steering path for the vehicle. For example, the vision system may display images of a road in the forward direction of travel of the vehicle and trailer and the overlay may indicate a steering path for the vehicle that tows the trailer around an obstacle, such as around a corner of an intersection or the like. For example, the vision system may display images of a road in the rearward direction of travel of the vehicle and trailer and may indicate a steering path for the vehicle to drive the trailer into a selected location, such as a parking space or the like. Optionally, trailer data (such as physical characteristic data or the like) may be input into the vision system to provide data pertaining to physical characteristics of the trailer.

These and other objects, advantages, purposes and features of the present invention will become apparent upon review of the following specification in conjunction with the drawings.

BRIEF DESCRIPTION OF THE DRAWINGS

FIG. 24 is a table showing exemplary caravan classes.

DETAILED DESCRIPTION OF THE INVENTION

Figure 1:
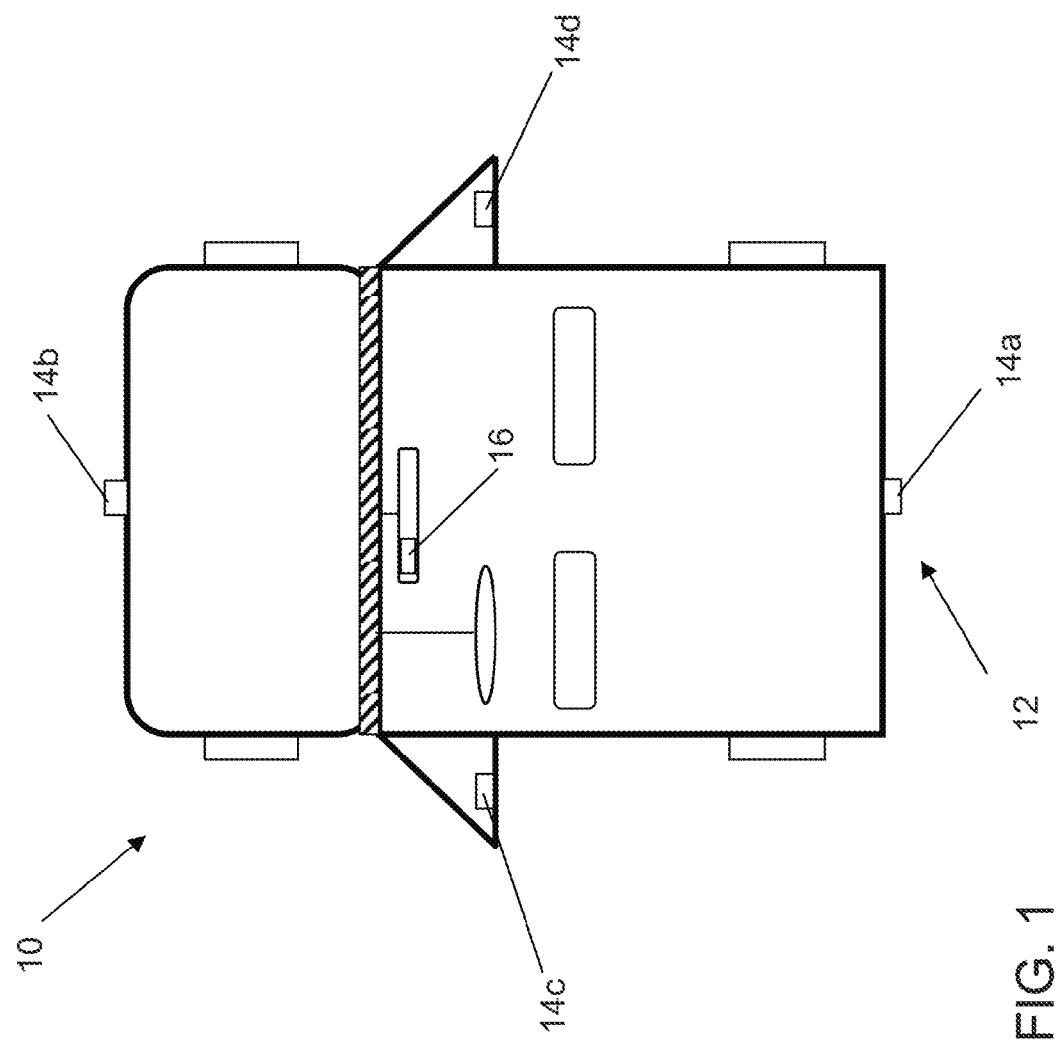
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at the front (or at the windshield) of the vehicle, and/or a sidewardly/rearwardly facing camera 14c, 14b at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

Driver assistant systems made to assist the driver when maneuvering a trailer are known. It is known in vehicle vision systems to overlay/map so called 'driving tunnels' on top of the outside (the vehicle's) view, captured by image capturing devices, especially cameras, to visualize the predicted way the vehicle would take when the chosen steering direction is kept by. The steering direction may be generally detected by steering angle sensors on the steering column. When the steering angle is changing, the driving tunnel may be adapted by the vision system algorithms. For doing that correctly, the vehicle's maneuvering trajectories may be regarded respectively. The driving tunnels may be superimposed on a display when the vehicle is maneuvering backward in one dimension for parking maneuvers.

As described in International Publication No. WO 2013/109869, published Jul. 25, 2013, which is hereby incorporated herein by reference in its entirety, overlays and display view modes may be displayed or shown for aiding the driver when the driver is trying to maneuver to a trailer hitch head or when he is driving close to curb stones or the like. In such situations, driving tunnel overlays come into use.

In U.S. patent application Ser. No. 13/774,317, filed Feb. 22, 2013, which is hereby incorporated herein by reference in its entirety, it is suggested to also use driving tunnels when the vehicle is driving in forward direction.

Driver assistant systems made to assist the driver when pulling or pushing a trailer without having a specific trailer angle sensor are described, such as in International Publication No. WO 2012/103193, published Aug. 2, 2012, which is hereby incorporated herein by reference in its entirety. Such trailer angle sensing systems may detect the trailer nicking angle (relative to the car) by targets on the trailer and the vision system's cameras instead employing special angle sensor on the rear hatch or door of the vehicle. In some systems, when attaching a trailer to the vehicle, the driver has to enter its properties to put the trailer driving aid system into a position to calculate the driving aids overlays properly, when backing up with a trailer attached.

Wireless camera data transmission is known already, especially WLAN. To attach wireless cameras onto vehicles or trailers at or after assembly is known. Especially analog image transmission is common use.

The present invention provides a vision system that (a) enables the (re-) identification of a just hooked on trailer to a trailer hitch by a trailer code sticker visible to the vision system, (b) is capable to determine the distance between the trailer (effective turning) axis and the hitch's nicking point by the trailer's nicking behavior while the team (vehicle and trailer) is in motion, (c) is capable to determine the trailer's total length by trigonometric size comparing of known size to unknown size image features, (d) is capable to determine the trailer's width by side camera image evaluation, (e) is capable to estimate or determine the trailer's tendency to oscillate when driving forward and is capable to cope with that oscillation, and (f) is capable to store the acknowledged properties of a certain trailer in an according data file, which may be reloaded when an already known trailer is re-identified. Another aspect of the present invention is the technical realization of how a wireless (such as, for example, via a BLUETOOTH® communication protocol) trailer camera (such as an after market camera) can be integrated into the (OEM-) vehicle vision system and utilized in the trailer driving aid.

For the (re-)identification of a just hooked on trailer to a trailer hitch it is herein suggested to fix a unique code sticker to the concerning trailer. This may be done by the vehicle and/or trailer owner or by the trailer manufacturer. Preferably, the sicker may be mounted in the center view of the vehicle vision system's (rear-) camera view. The sticker may consist by a one dimensional (1D) code or a two dimensional (2D) code or even by a three dimensional (3D) hologram or the like, or may consist of a kind of display (such as a LCD or E-ink display or the like). As an aspect of the present invention, the sticker may be made of a durable material, which may have a dull surface with a high contrast, either in black and white (or gray scale) or in color. The material may have fluorescent or self-illuminating properties in a visible or non-visible wavelength band. The material may have the capabilities to reflect light better which is in a non-visible wavelength (band) as like infrared or near infrared light or ultra violet light or the like. The sticker may even have quite low visibility in the visible wavelength light and may appear as like the surrounding coating, which may make the sticker nearly indiscriminatable for a (normal viewer), but the sticker may be highly visible for a camera filtering different wavelengths or emphasizing a particular wavelength or wavelengths. The code may at least in part be embodied by a new or known 2D code (Semacode), such as like QR-code, DataMatrix, Cool-Data-Matrix, Aztec-Code, UPCODE, Trillcode, Quickmark, ShotCode, mCode, Beetagg and High Capacity Color Barcode and/or the like. The sticker and detection system may utilize aspects of the trailer angle detection systems described in U.S. patent applications, Ser. No. 14/036,723, filed Sep. 25, 2013, and/or Ser. No. 13/979,871, filed Jul. 16, 2013, which are hereby incorporated herein by reference in their entireties.

Figure 23:
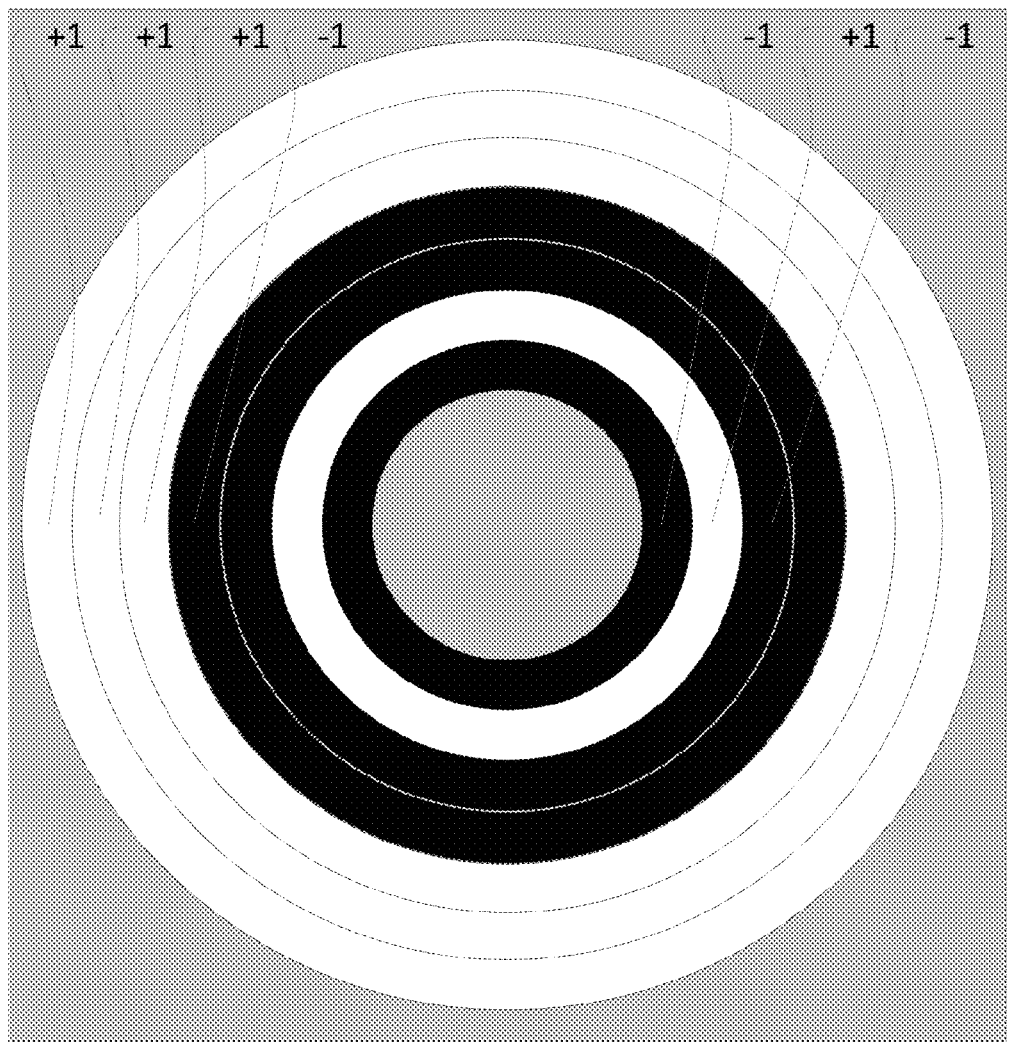
FIG. 23 is an example of a trailer target sticker utilizing a Barker coding of lengths, with seven concentric circles in black and white on gray background, shown with plus or positive ones as white circles and minus or negative ones as black circles, whereby the coding is realized from the outer rings to the inner rings.

The target sticker may have at least a region on which a code is placed that may possess a minimal auto correlation, such as a Barker-Code (known for use in synchronization methods in RADAR systems or in checking microchips) or the like, but heretofore not known in automotive vision systems. For use in a vision system as a target that is in a camera view, the minus ones and plus ones may be expressed in black and white concentric circles having a gray background. By that the code is rotation invariant. An according example is shown in FIG. 23. When using a Barker code based target, no corner or edge discrimination or feature tracking may be necessary for finding the target (via image processing of captured image data). For finding the target during run time it may be sufficient to run a maximum signal search by comparing the pattern matching one every test position. The matching may be rated as higher when there is less difference between a tested area and the compared Barker code pattern. The search may run or scan over the whole captured image (such as captured by a rear viewing vehicle camera). It may be preferred to run the search exclusively over an area in which the target is expected to be present. With a hooked on trailer attached at the rear of the vehicle, the distance of a mounted target to the (vehicle's rear) camera is comparably steady. Thus, no scale variants may have to be considered in the maximum signal search. There will typically be one substantial peak emerging out of the noise in matching distances which may be mostly even regardless of the pattern or illumination (pattern) that the real world's image portion may be around the pattern.

As an addition or alternative to the sticker that may be seen or read out by a vehicle camera (such as the rear vehicle camera), the sticker or identification element may have a wireless transponder, such as a passive or active RFID transponder or the like. Such a device may be low cost and may be uniquely codable and suitable for such external use at a vehicle and trailer.

Optionally, instead of having a sticker, the information may be stored by a control device attached to the trailer. The control device may be wired or wireless. Preferably, a wireless camera or other device may be in use, transponding or communicating the trailer's identification and/or properties (and optionally camera image data) to a receiver in or at the attached vehicle.

The sticker's or transponder's code may be unique or at least very rare to exclude double seizures, since the main purpose is to distinguish each trailer from another. The trailers may have some properties which matter to the vision system, necessary to switch on or calculate the driving aids correctly. There may by properties which may be collectable when hooking on the trailer (such as trailer color), and other properties while driving (such as the trailer's cornering trajectories), but there may be other properties that may stay undetected unless these become either provided by driver entry, which is quite inconvenient, when the driver has to do it all time he hooks on a trailer, or provided by a data base from a storage media or from a remote device or system. The data base may contain a static and a dynamic data set.

The static data set may be similar/identical for a group or a type of similar/identical trailers. These may be provided by the trailer's manufacturer or vehicle vision system's manufacturer or vehicle's manufacturer or by a service provider. The static data may contain essentially the general data out of the individual trailers data sheet, such as, for example, dimensions, maximum load, count of axles, own weight, mass center when empty, suspension parameters and/or the like. The data (base) may be stored locally within the vehicle and updated from time to time and/or may be called any time a trailer is attached to the vehicle or during vehicle service, such as from a remote data storage/server or a cloud via any kind of data communication system (such as WiMax, WiBro, UMTS, HSPA, LTE, CDMA or the like) installed in the vehicle or attached to the system or via a OEM car (garage) service device.

The database's dynamic data set may contain parameters which may be acquired during driving. As discussed below, there may be a method or algorithm to determine the distance from the hitch to the trailer's axis center. Other dynamically acquired parameters may regard to the trailer load extension, the trailer total weight or the mass center when the trailer is loaded, dampening capabilities of the suspension system and the tires. Optionally, the trailer tires' inflation status may be monitored as well.

All data may serve to compute in a driving assistance system which aids the driver to dampen the lateral swinging of the trailer when driving. This is mostly interesting when driving forward with higher speeds. A single axis or single axle trailer with two suspended tires mostly (arched) behaves as a PT2 system (assuming the tires are not skidding laterally). System parameters are the total mass, the mass center point regarding the lateral turning point (axis), the spring and dampening capabilities of the suspension in combination to the tires. The stimulus is mostly the curvature acceleration (speed, speed change ratio, turning angle and turning angle change ratio). This is mostly depending on the pulling vehicle's driving style. A trailer stability assist system may operate to keep the stimulating frequencies (and its harmonics) low in amplitude which are close to the resonance frequency $\omega_0$ of the trailer PT2 system. A stability system may be capable to steady an already swinging trailer system by anti cyclical stimulation (within PT2 systems harmonics). There may be advanced phasings (e.g. about 90 degrees) which act best as anti cyclical/becalming stimuli.

The system may be capable to estimate the trailer's weight by dividing the difference of the (average) acceleration when the vehicle is accelerating with the trailer and the (average) acceleration of the vehicle without a trailer attached when the same force coming from the engine's torque is pulling on the team ($m=F/(a_t-a_v)$).

Knowing the trailer mass, the system is capable to estimate the trailer's mass center's height by observing the trailer's nicking angle while crossing a curve. The radius the trailer is passing the curve can be determined by the steering angle and the equations relating the trailer shown below. The lateral force to the trailer's mass is given by the mass multiplied with the squared speed divided by the radius:

$$F_z = mv^2/r.$$

With $F_d$ being a depending on $F_z$ regarding the lever length and turning angles, the spring rate D of the trailer system may be calculated:

$$D = F_d/y;$$

during y is the way of spring compression.

The resonance frequency of the system is given by $\omega_0$:

$$\omega_o = \sqrt{\frac{D}{m}}$$

Alternatively, $\omega_0$ may become observed directly on the dynamic swing oscillation of the trailer.

Figure 9A:
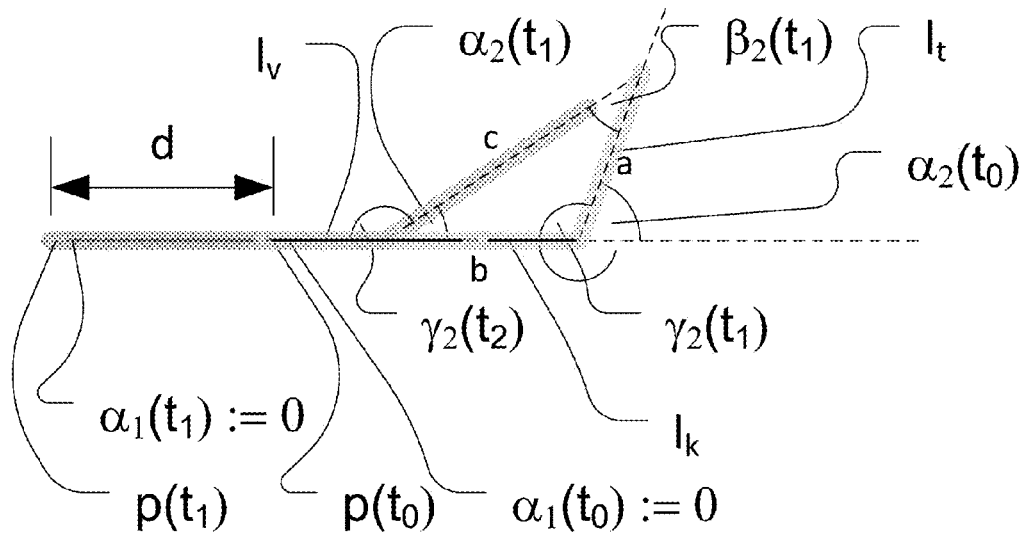
Figure 9B:
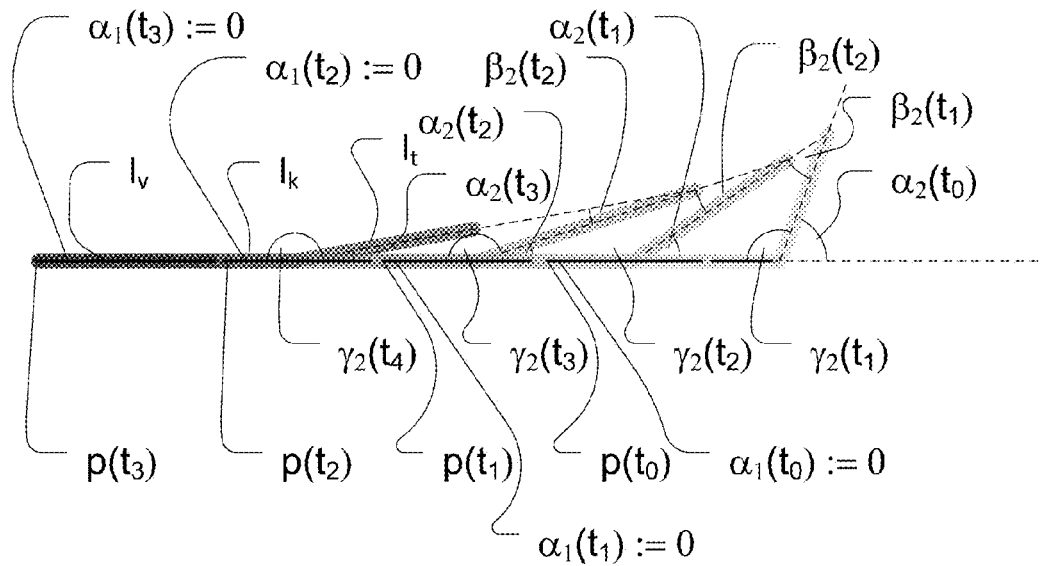

The trailer's axis distance to the hitch ($l_t$) is calculatable in two particular cases. The first case is: the pulling or pushing (both possible) vehicle is not changing its direction which means its steering angle is zero but the trailer has an angle $\gamma_2$ to the car (at least at the beginning). Referring to FIG. 9A and FIG. 9B, since the length (b) equates to the driving distance (d) between measuring increments ($t_n$) to ($t_{n+1}$) between the points ($p(t_n)$ and $p(t_{n+1})$, is known and the center of the trailer axis is always pointing to the vehicle's hitch turning point, the triangle enclosed between the trailer axis center, the vehicles hitch at a measuring increment ($t_n$) and the vehicles hitch at a measuring increment ($t_{n+1}$) has two known angles $\gamma_2$ angle $\alpha_2$. The turning angle of the trailer axis is described by the angle $\beta_2$. The angle $\alpha_2$ of the point of time (n) equates to $\P-\gamma_2$ of the consecutive measuring increment of $t_{n+1}$ (see equation (2) below). The flank (a) of the triangle has always the length of the trailer. All angles can (finally) be described by the trailer angle $\gamma_2$ at different consecutive points of time:

$$l_t = \frac{\operatorname{Sin}\alpha_2(t_n) \cdot d}{\operatorname{Sin}\beta_2(t_n)} \tag{1}$$

$$\alpha_2(t_n) = \P - \gamma_2(t_{n+1}) \tag{2}$$

given that: $\alpha_1 = 0$; from ($t_n$) to ($t_{n+1}$)

$$\beta_2 = \P - \alpha_2 - \gamma_2 \tag{3a}$$

$$\beta_2 = \P - (\alpha_2 + \gamma_2) \tag{3b}$$

$$\beta_2(t) = \P - ((\gamma_2(t_n) + \gamma_2(t_{n+1})) \tag{3c}$$

$$d = (p(t_n) - p(t_{n+1}) \tag{4}$$

$$l_t = \frac{\sin(\P - \gamma_2(t_{n+1})) \cdot ((p(t_n) - p(t_{n+1})))}{\sin(\P - ((\gamma_2(t_n) + \gamma_2(t_{n+1})))} \quad (5)$$

given that:
$\alpha_1(t_0) = 0$
and $\alpha_1(t_1) = 0$
and $(\gamma_2(t_n) + \gamma_2(t_{n+1})) \neq \P$.

With reference to FIG. 9B, $l_t$ is calculatable at the time stamps $(t_1)$, $(t_2)$ and $(t_3)$ given that: $\alpha_1(t_0$ to $t_3)=0$ and $\alpha_2(t_0$ to $t_3) \neq 0$ (the trivial case $\alpha_2 = 0$ which is identical to $\beta_2 = 0$ would produce a division by zero).

| | |
|---|---|
| $\alpha_2(t_0) = \P - y_2(t_1);$ | given that: $\alpha_1 = 0$; from $(t_0)$ to $(t_1)$ |
| $\alpha_2(t_1) = \P - y_2(t_2);$ | given that: $\alpha_1 = 0$; from $(t_1)$ to $(t_2)$ |
| $\alpha_2(t_2) = \P - y_2(t_3);$ | given that: $\alpha_1 = 0$; from $(t_2)$ to $(t_3)$ |
| $\alpha_2(t_3) = \P - y_2(t_4);$ | given that: $\alpha_1 = 0$; from $(t_3)$ to $(t_4)$ |

The second particular case the trailer's axis distance to the hitch ($l_t$) is calculatable is when the pulling vehicle is driving in a constant turn, which means angle $\alpha_1$ stays constant and unequal zero over a certain time until ($t_n$) and the trailer angle $\alpha_2$ is in a steady state (not changing any more between time increments). In fact ($t_n$) is given at the time angle $\alpha_2$ is in steady state ($\alpha_2(t_n) = \alpha_2(t_{n-1})$). Since pushed trailers are Metha stable in practice a steady state can't be reached without permanently changes of $\alpha_1$.

Figure 2:
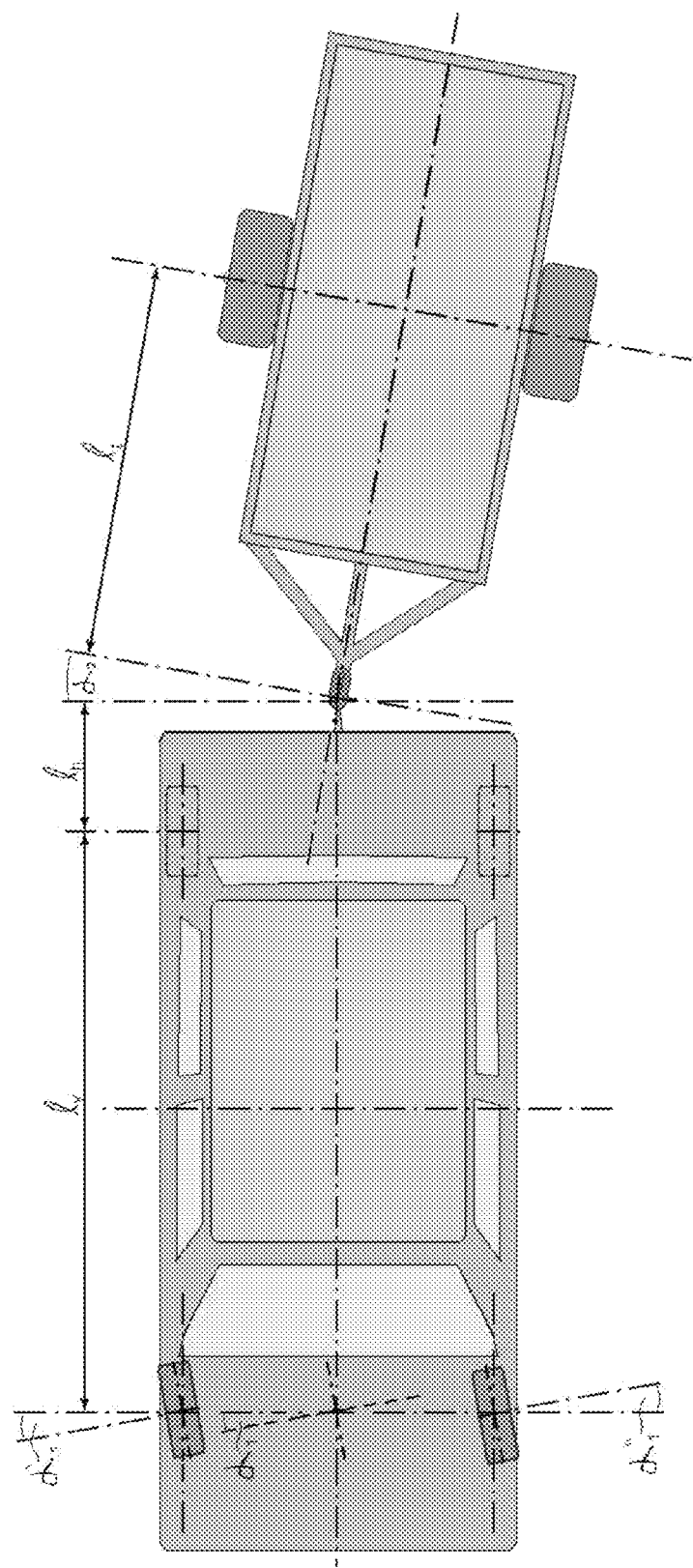
FIG. 2 is a plan view of a vehicle and trailer.
Figure 10:
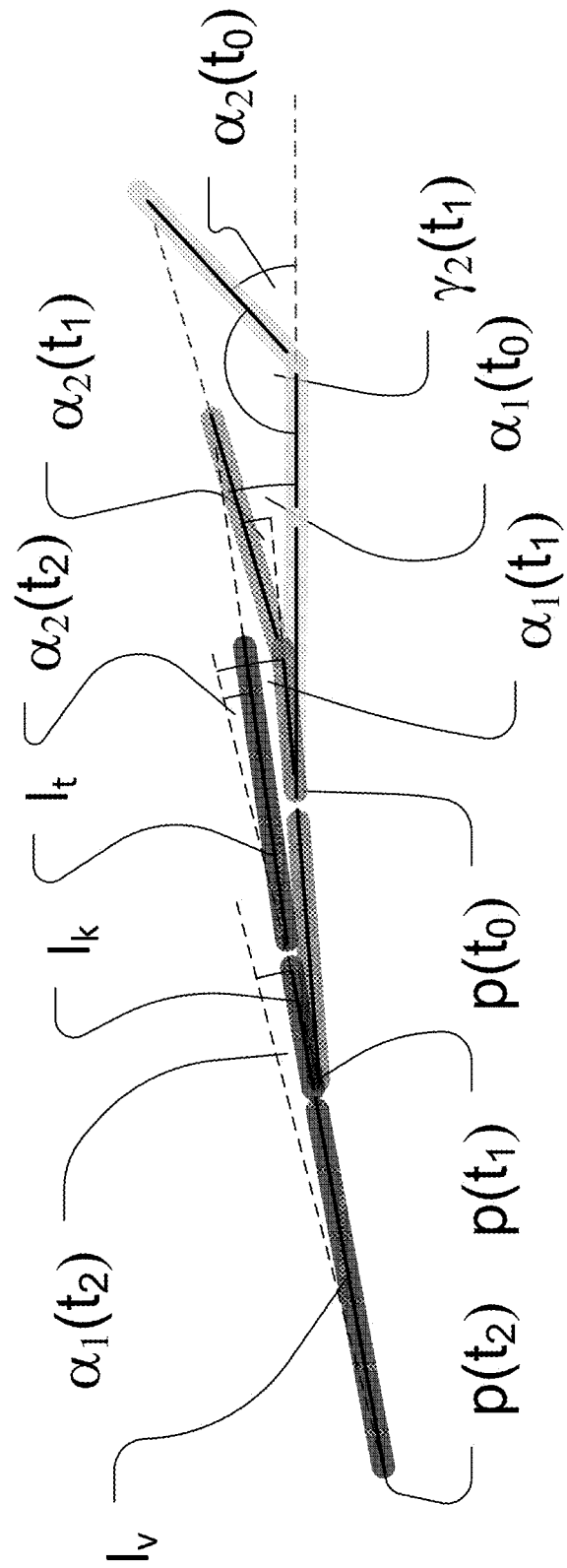

FIG. 10 shows an example of a vehicle—hitch-trailer system. A trailer is swinging into the driving direction along a curved driving path the pulling vehicle describes. The path is given by the way points $p(t_0)$ to $p(t_2)$. At $t_0$ the trailer has an angle $\alpha_2(t_0)$ to the vehicle. The vehicle's (front-) steering wheel's angle $\alpha_1(t_0)$ is <0 (negative compared to the trailer's angle depending on the reference system). The vehicle's axis or wheels have the length $l_v$, the hitch's (turning) head has the distance to the rear vehicle axis $l_k$ and the trailers axis (of a one axis trailer) has the distance $l_t$ to the hitch's head (see also FIG. 2).

Figure 7:
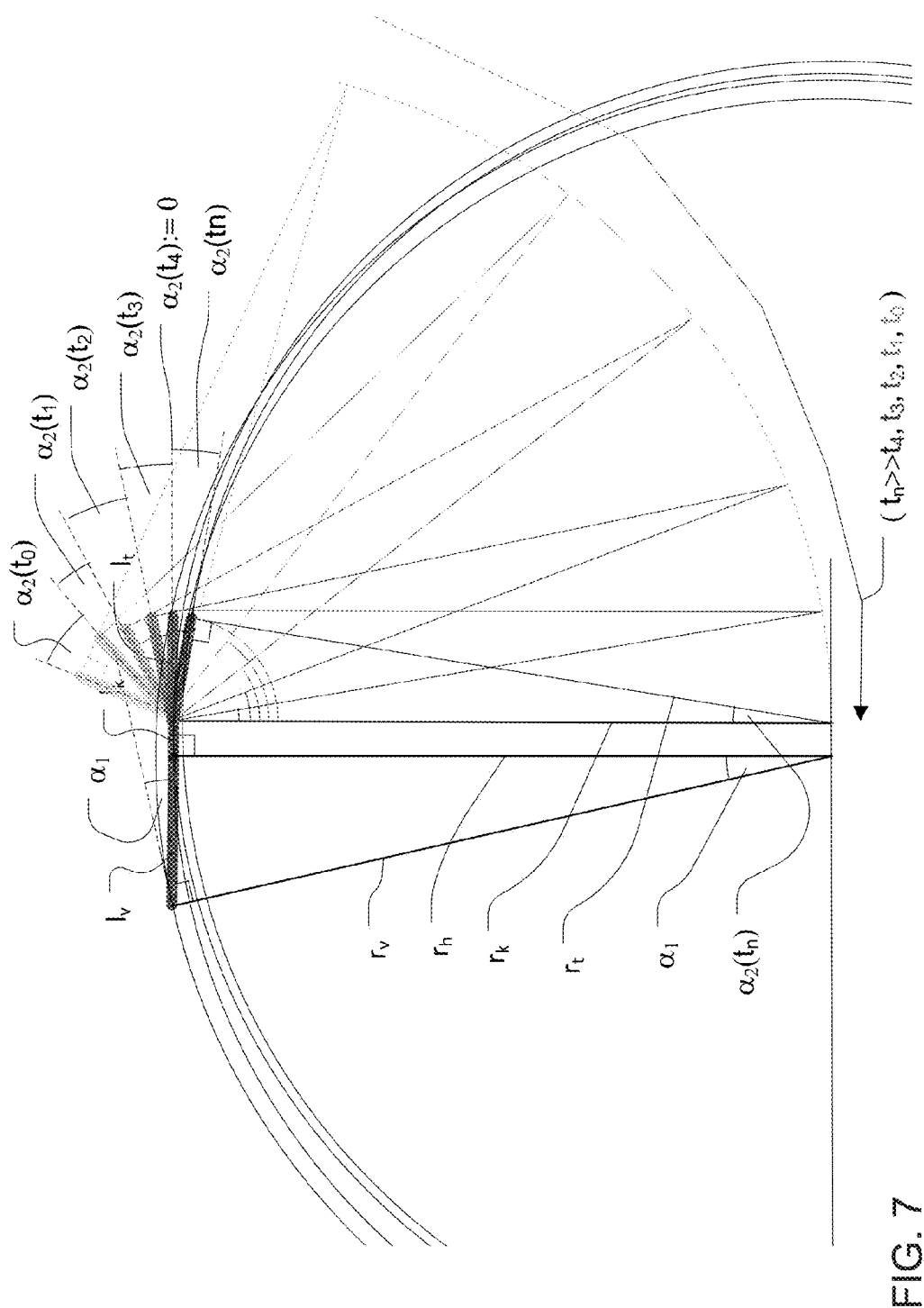
Figure 8:
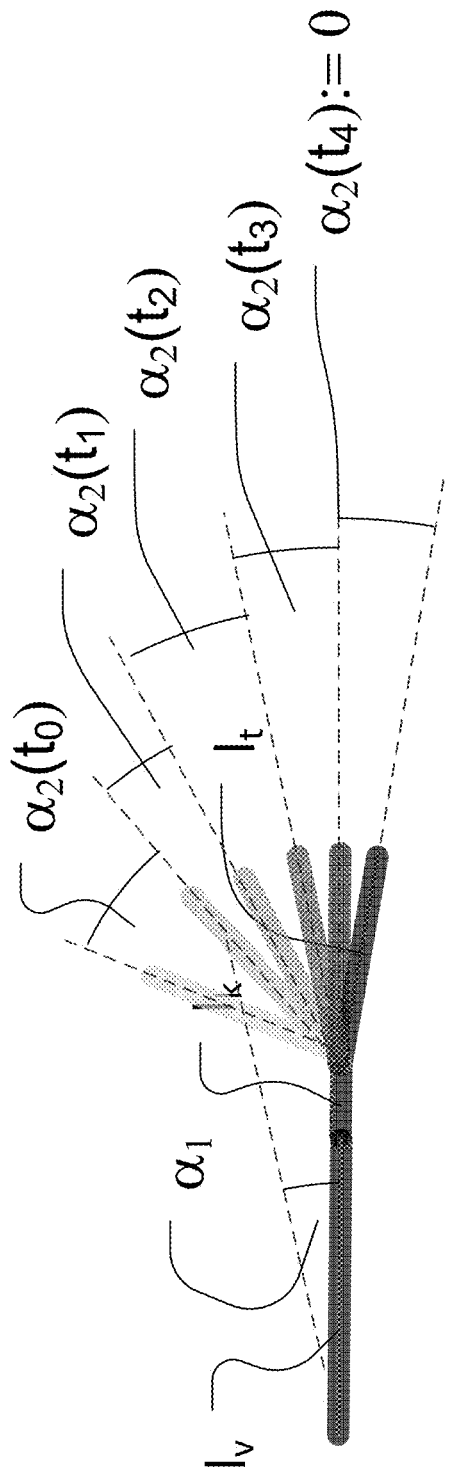

FIGS. 7 and 8 show a similar scene with more waypoints, showing the trailers nicking relative to the vehicle (staying focused on the vehicle); $\alpha_1$ stays constant over the whole time. In FIG. 7, the turning circles of the relevant axis are schematized, also the triangles spanned between the trailers axis center, the turning center of the trailer and the hitch head. The trailer's turning center may be in ascertainable before reaching $t_n$. The angle $\alpha_2(t_n)$ is identical.

Figure 3:
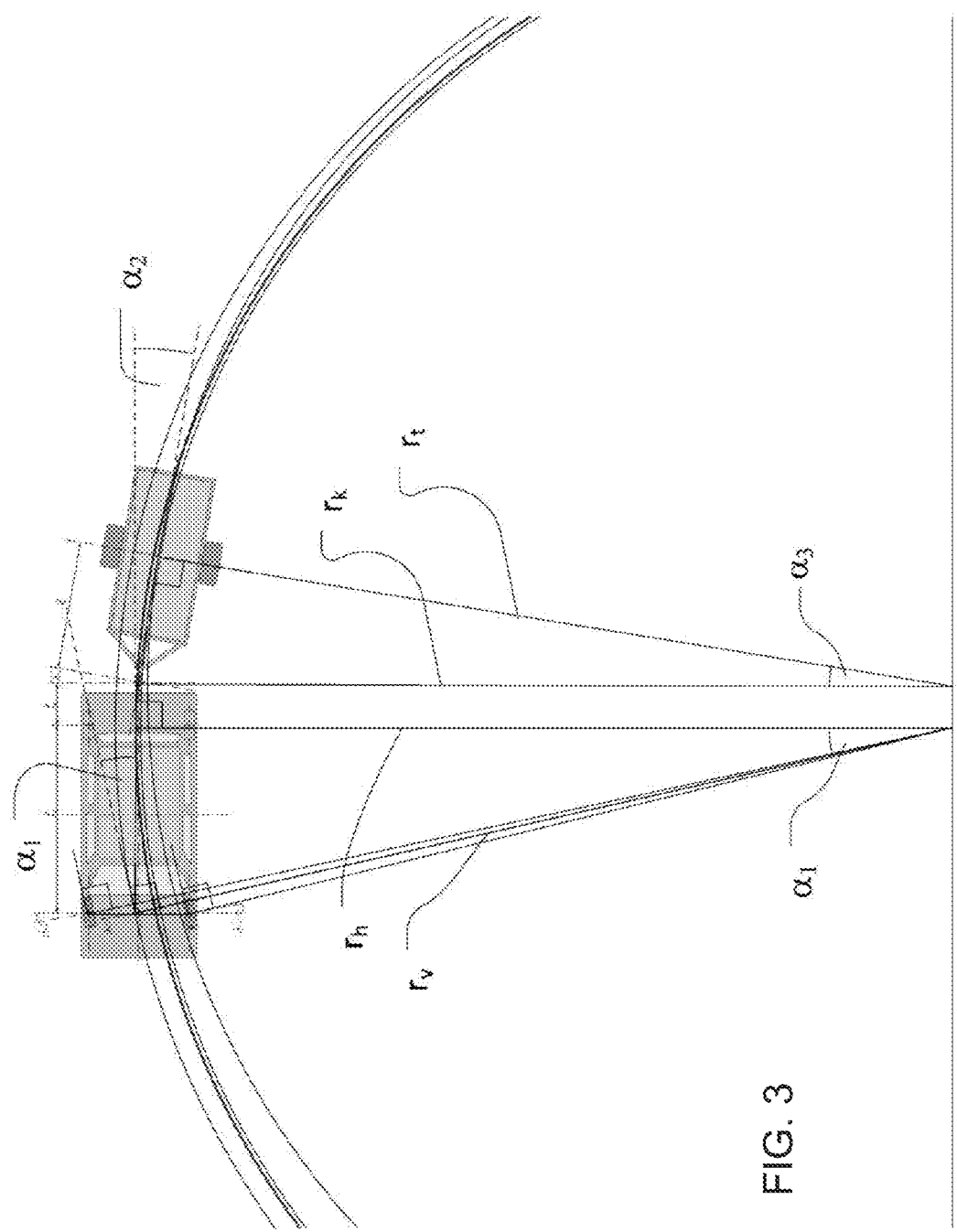
FIG. 3 is a plan view of the vehicle and trailer shown as the vehicle pulls the trailer along a curve.
Figure 4:
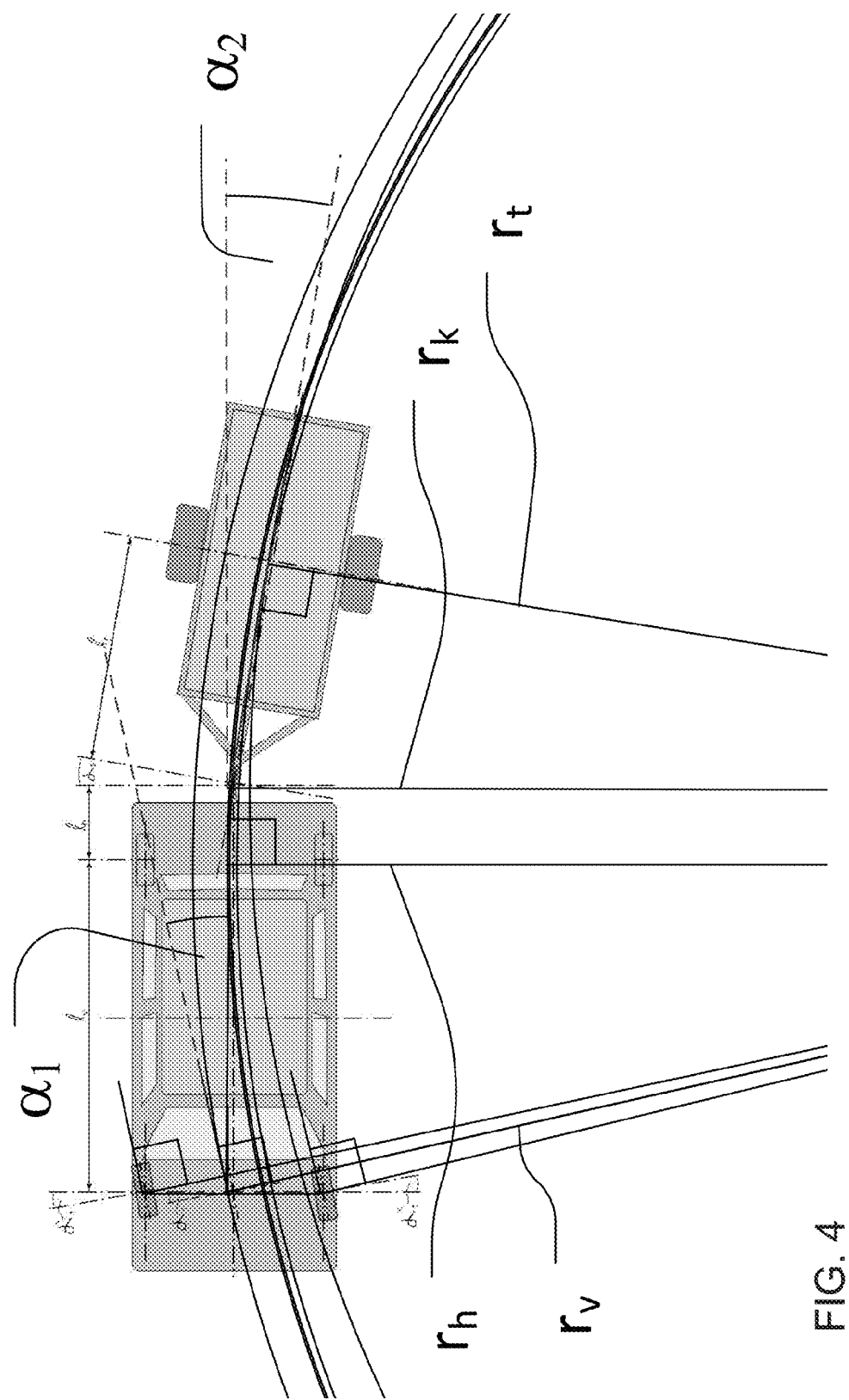
FIG. 4 is an enlarged plan view of the vehicle and trailer of FIG. 3.
Figure 5:
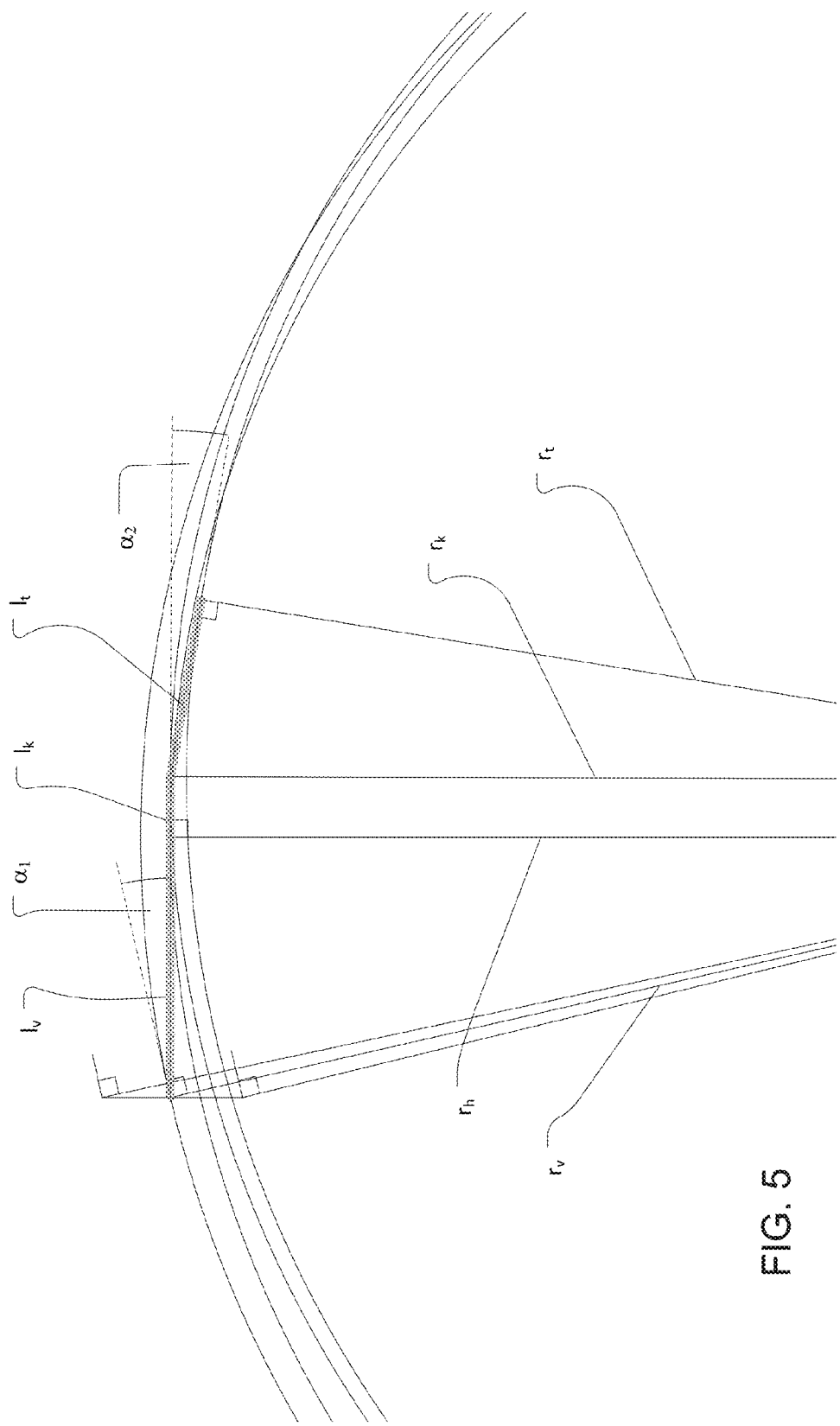
FIGS. 5-10 are schematics showing of the vehicle and trailer of FIGS. 3 and 4.

FIGS. 3 and 4 show the fully swung in case $\alpha_2(t_n)$ when the vehicle steering angle is <0. At that case ($t_n$) the vehicle's axis (rear and ~average of both front) extensions are meeting in the center of the turning circle. In the scheme in FIGS. 5 and 6, the same scene is schematized showing the front wheels all describe an own (different) circle with wider or closed radius as the front wheels center $r_v$ respectively. It becomes aware that the vehicle's rear axis center has a smaller radius $r_h$ with the same center as the front wheels center $r_v$. Since the hitch is an extension of the vehicle's center line, orthogonal to the rear axis it's head radius $r_k$ to it's turning point is identically to that of the vehicle's rear axis center, but shifted sidewards by the length of the hitch (to the axis) $l_k$.

Figure 6:
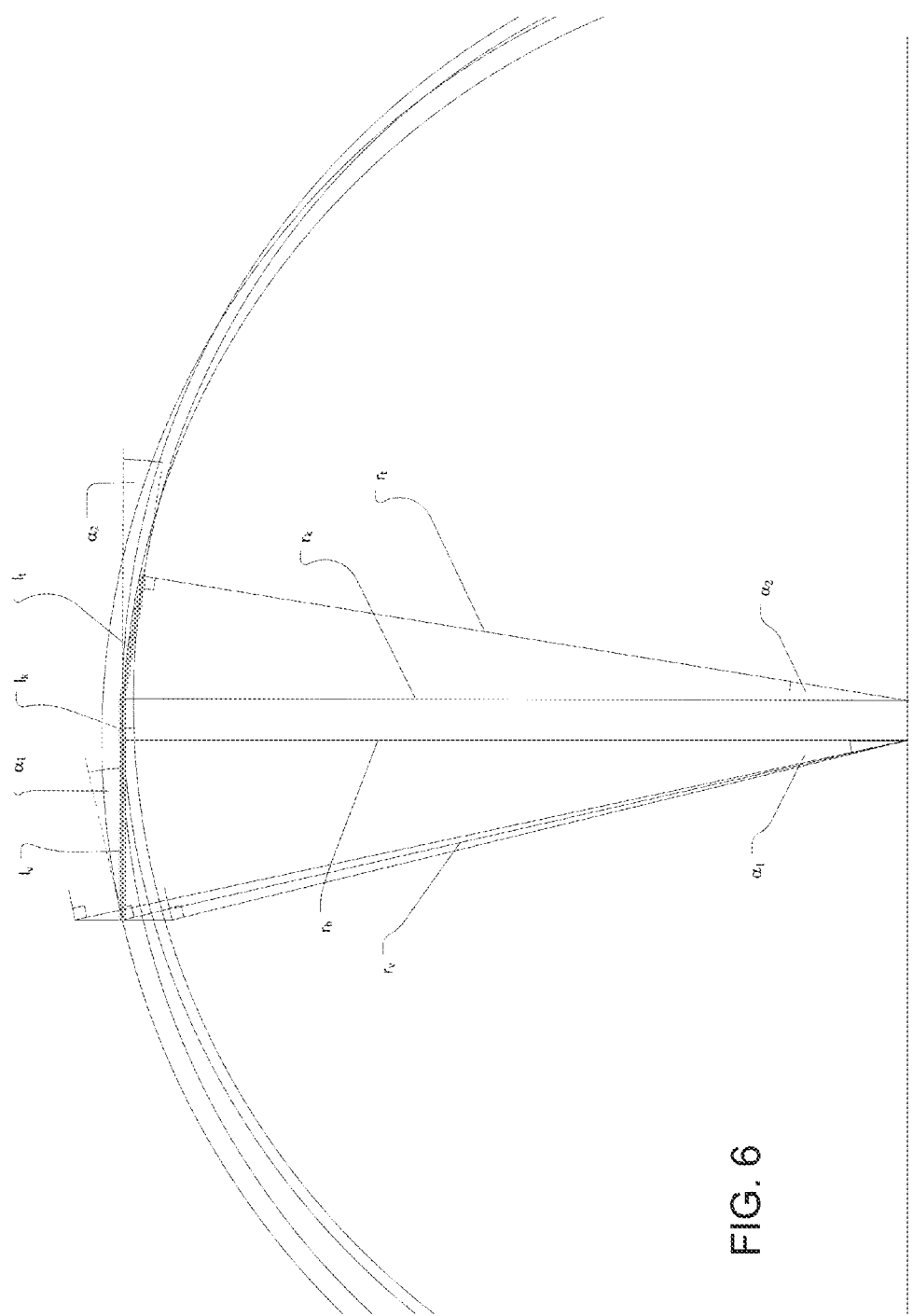

FIG. 8 shows the dynamically change of the trailer angle $\alpha_2$ relative to the vehicle over consecutive time steps $\alpha_2(t_0)$ to $\alpha_2(t_n)$, combining FIGS. 6 and 8. The time stamp's properties are drawn lighter the more the age is. In this schematic it is noticeable that the trailer's hitch radius is only then identically to the rear axis radius of the car when the trailer is in a swung in condition $\{\alpha_2(t_n)\}$ and the $\alpha_1$ is kept constant. If $\alpha_1$ would change the common center would be left.

The only calculatable case is the swung in case as like shown in FIG. 6. At that time the trailer length is given by the equation:

| (6) | $l_t = \sin \alpha_2(t_n) \cdot r_k$ | |
|---|---|---|
| given that: | $(\alpha_2(t_n) = \alpha_2(t_{n-1}))$ | {steady state} |
| and given that: | $(\alpha_1(t_n) = \alpha_1(t_{n-1}))$ | {steady state} |
| and given that: | $\alpha_2(t_n) \neq 0$ and $\alpha_1(t_n) \neq 0$ | {non trivial case}. |

Another aspect of the present invention may be to cumulate the acquired measuring results of $l_t$ as an average of some or all (plausible) results which were measured each time one of both cases mention above appear. The average value may be stored within the system or may be remotely provided in a manner as mentioned above as a property dedicated to a specific trailer which becomes reloaded from the storage media at a time a known trailer becomes hooked onto the vehicle again.

Figure 11:
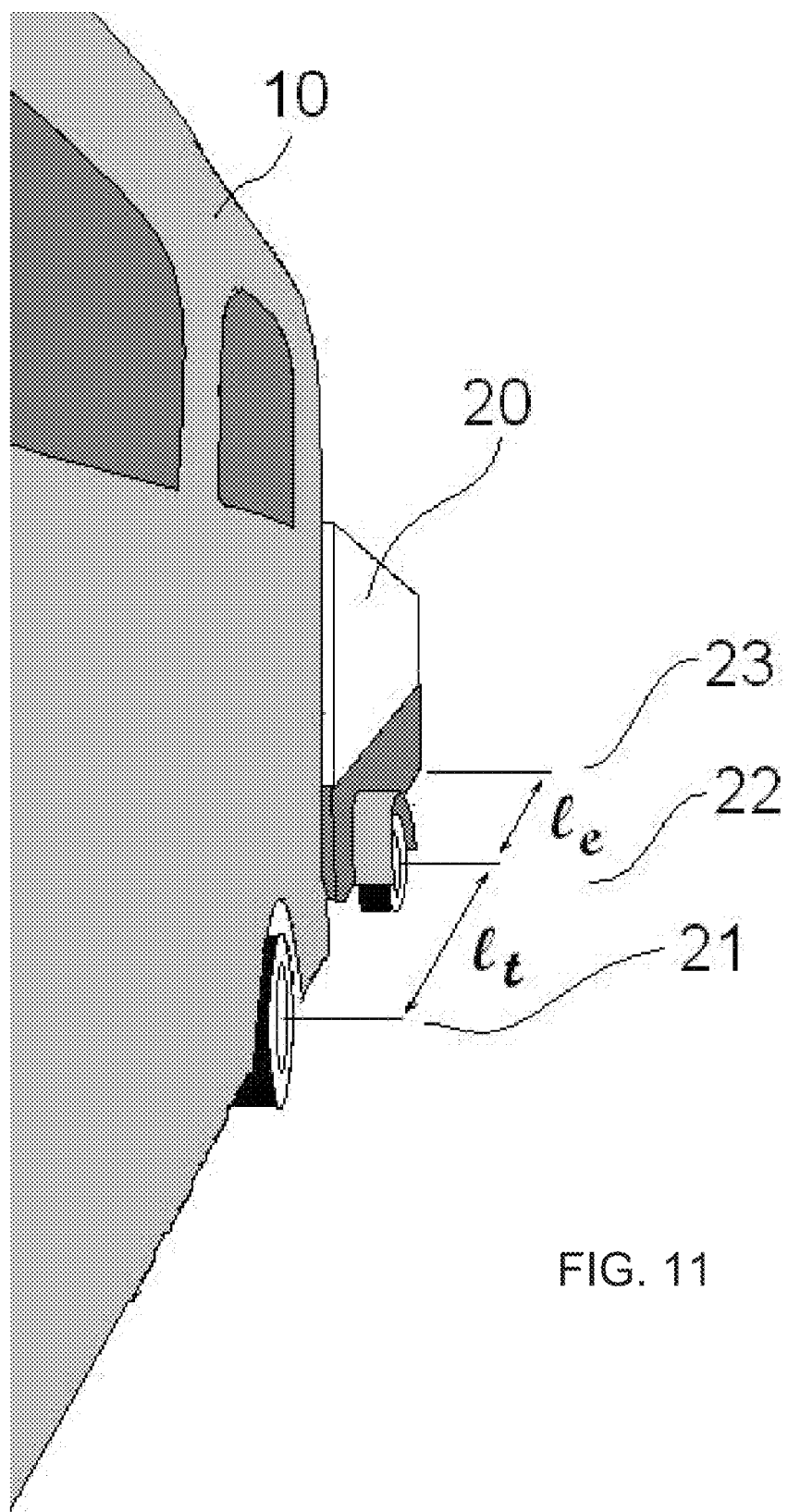
FIG. 11 is a perspective view of the side of the vehicle and trailer, such as viewed by a side camera of the vision system of the present invention.

As an additional aspect to the present invention, the system may be capable to determine the trailers (20) total length by trigonometric size comparing of the known size '$l_t$' between vehicle (10) rear axis (21) and the trailer's axis (22) in FIG. 11 to the unknown size '$l_e$' of the trailer's rear end (23) to the trailer's axis (22) (of a one axis trailer, the axis common center accordingly when there are more than one axis or axle). This may happen as soon the system may calculate or estimate the trailer axis distance $l_t$ the first time.

Figure 12:
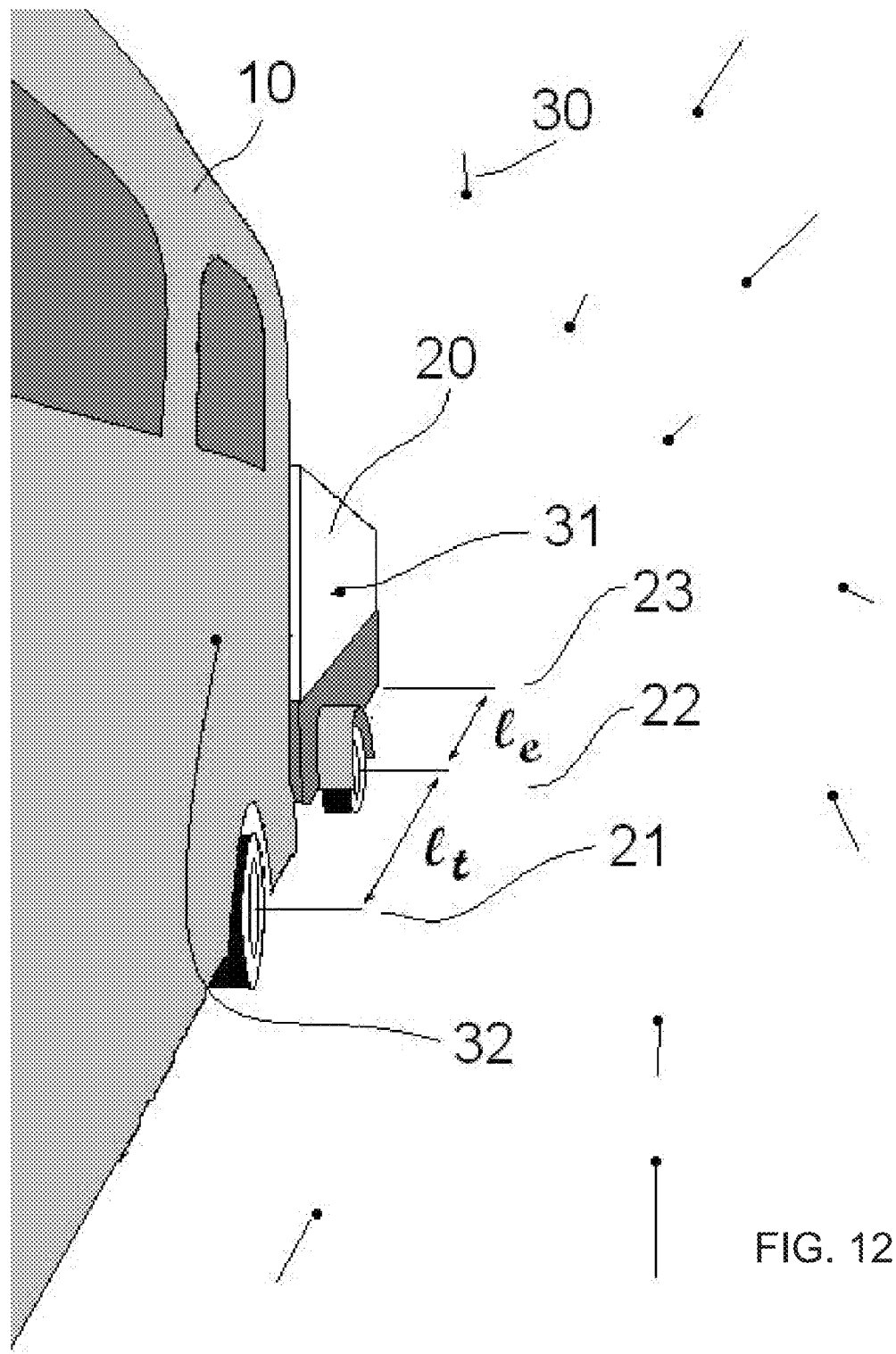
FIG. 12 is another perspective view of the side of the vehicle and trailer as in FIG. 11, showing motion vectors.

Since the trailer is always following the pulling vehicle, it is steadily present within the vehicle vision system camera views 14a, 14c and 14d (not in the front camera 14b). By object detection and tracking methods, such as, for example, by image difference subtraction, the static items within each camera scene while the vehicle plus trailer is in motion can become discriminated. The system may include or provide methods to also distinguish the vehicle's own components within the view. A method may be to comprehend these tracked points motion vectors which are identical (within a specific tolerance band) to one object during grouping substantially other tracked points motion vectors to another. In an exemplary case shown in FIG. 12, the surrounding world's points motion vectors (30) have the common property to point to a common vanishing center. The motion vectors of points (31) which are dedicated to the hooked on trailer have the common property to move substantially into another direction as the vanishing point and the vectors are comparably short often sidewards and do not disappear over a high number of consecutive frames. The vehicle's own components point's (32) may have the common property to be nearly fully static and never disappearing, when the vehicle is in motion.

As a use case for the trailer angle detection system, the system may calculate the paths that the vehicle front wheels, the rear wheels and the trailer's wheels will take when the driver is continuing the driving direction according the current steering angle. As a more useful and sophisticated solution, the vision system may be able to do a three dimensional (3D) world reconstruction or at least a lateral object detection and distance estimation/calculation. An optimal system may also be able to do an object and road surface classification for interpreting the environmental conditions. The system may be able to distinguish the drivable surface from prohibited space and objects which ought not to be hit by the vehicle and the trailer that is towed by the vehicle. This may happen by regard of known or provided context information. Such information may include mapping information (such as, for example, OpenStreetMap® information or the like), visual data from a remote device (such as, for example, information or data from or captured by a parking lot camera with wireless camera signal) or data from a parking space management system or that like (which provides the position of free parking spaces). Within the reconstructed 3D space, the system may plan a driving path for the vehicle and the trailer in a way that neither one of the wheels runs over or scratches at an object or violates the prohibited driving space (which may be a pedestrian banquette or the flower bed around the parking lot).

Figure 13:
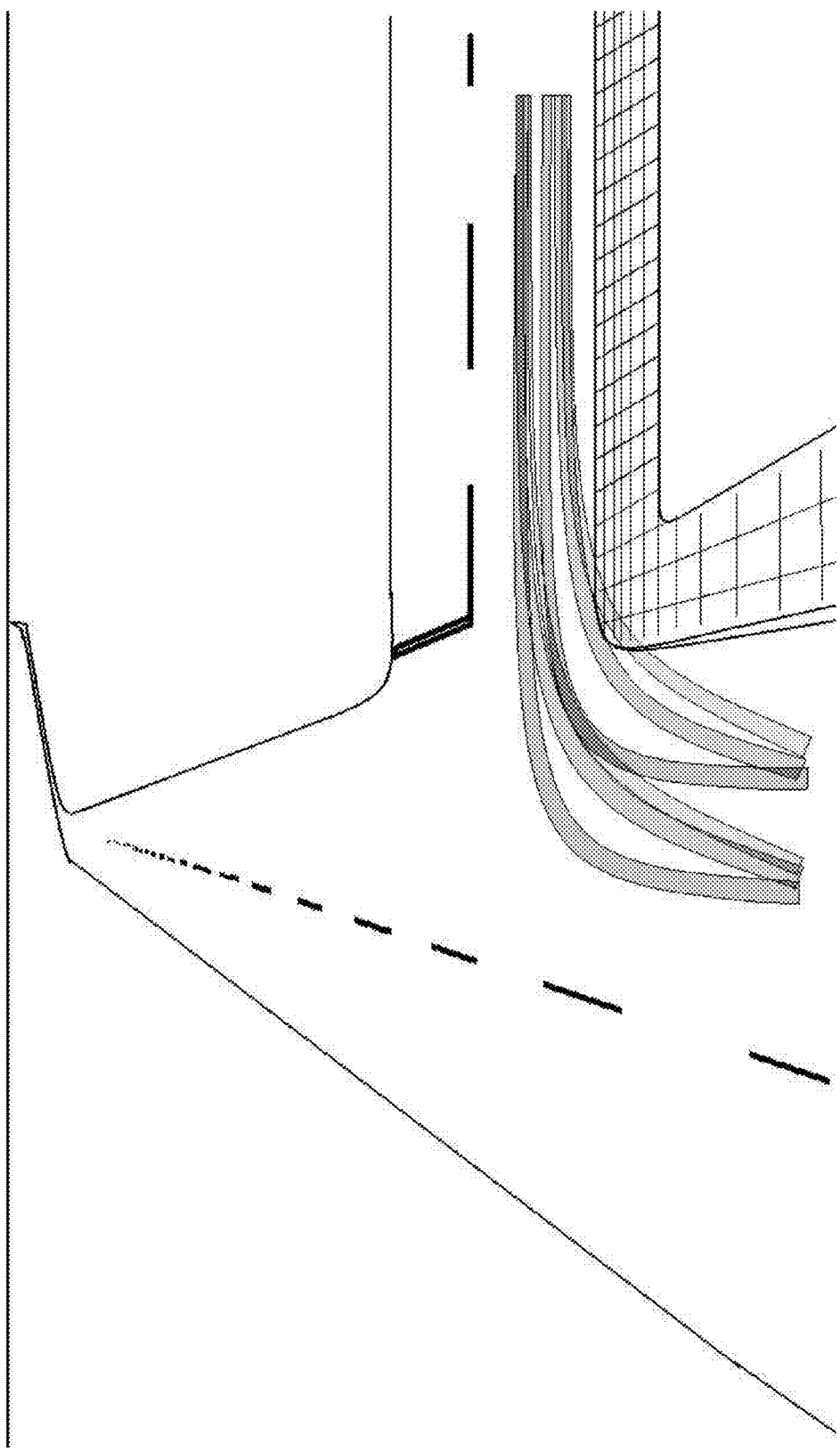
FIGS. 13-15 are perspective views of an intersection on which predicted driving paths are mapped.
Figure 14:
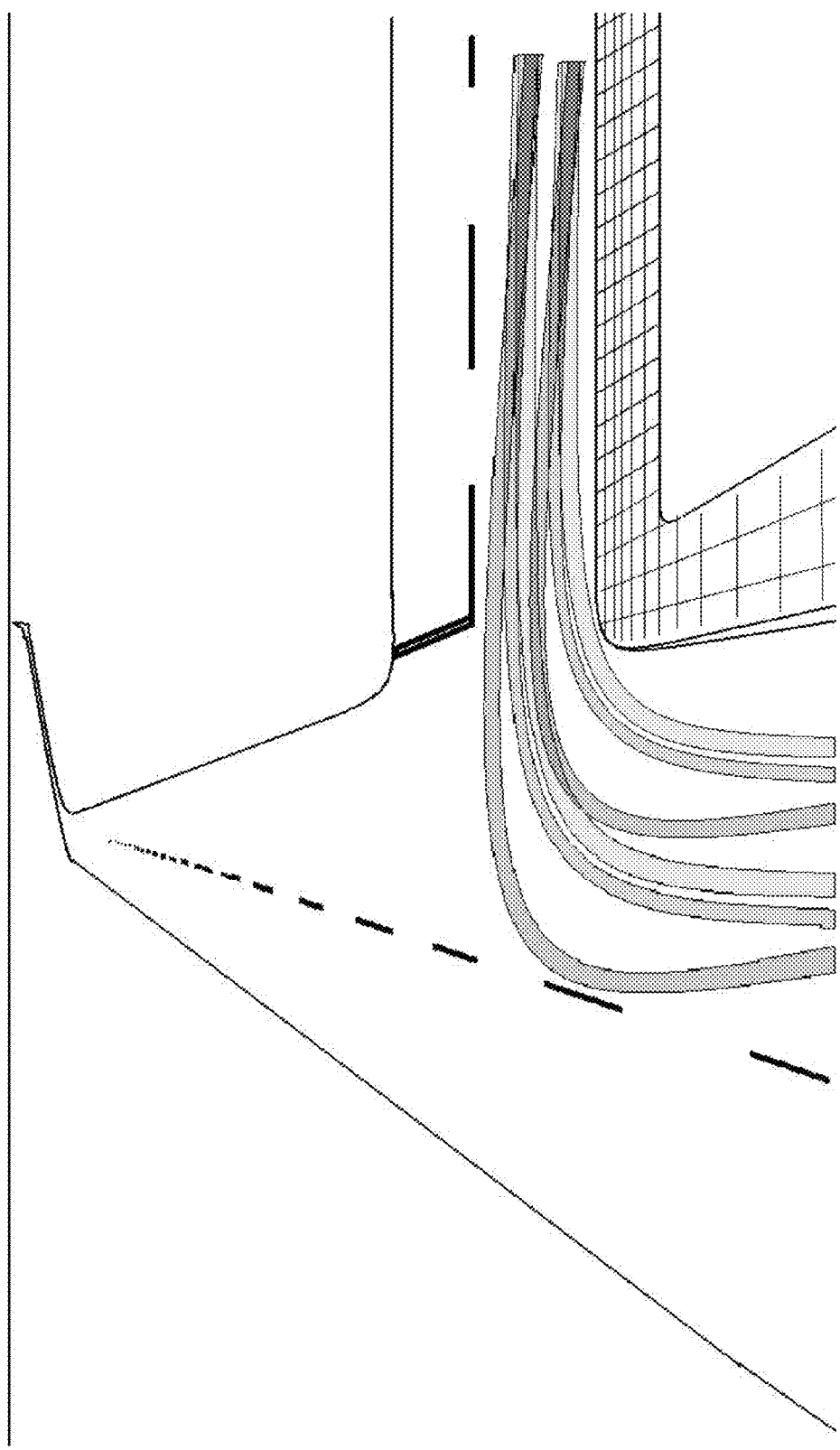

FIG. 13 shows a stylized scene of an intersection on which predicted driving paths are mapped. The vehicle's front wheels pair is shown in dark gray, the rear wheels lighter and the trailer's wheels the lightest. In this example, the vehicle is driving forward and the steering wheels' path is chosen too narrow and thus does not prevent the rear wheel from scratching the stylized pedestrian banquette (of course since the rear wheels' path and trailer's path are dependent on the path the front wheels take). A possible or nearly ideal path within the same situation is shown in FIG. 14. Here, the vehicle strikes out before turning into the intersecting road which means the front wheels first describe a curve to the left before bending to the right. Though the front wheels do not cross the center line of the road and thus don't encroach into the other lane. The rear wheels and the trailer's wheels describe a more narrow curves but do not contact the pedestrian banquette.

Figure 15:
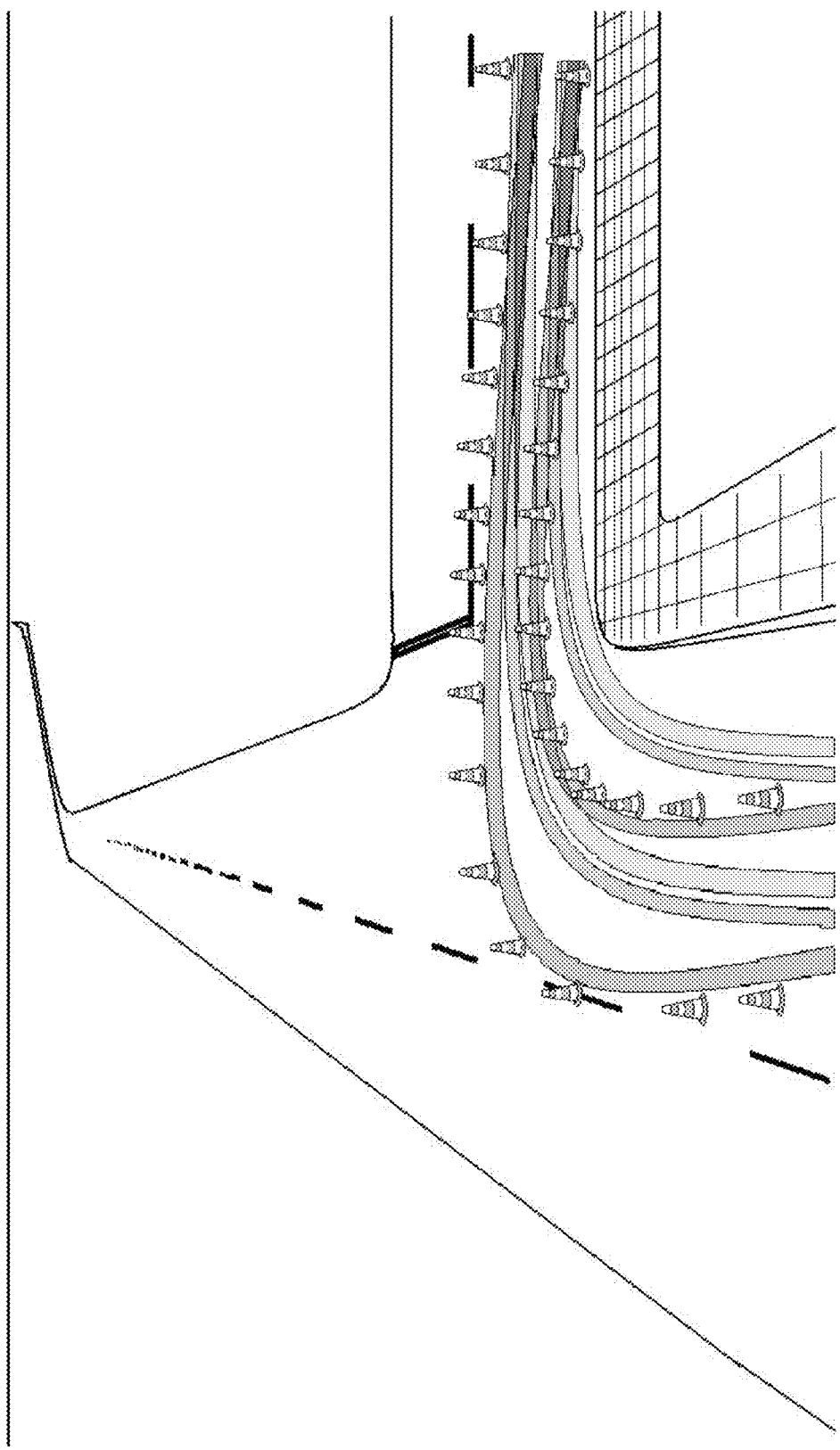
Figure 16:
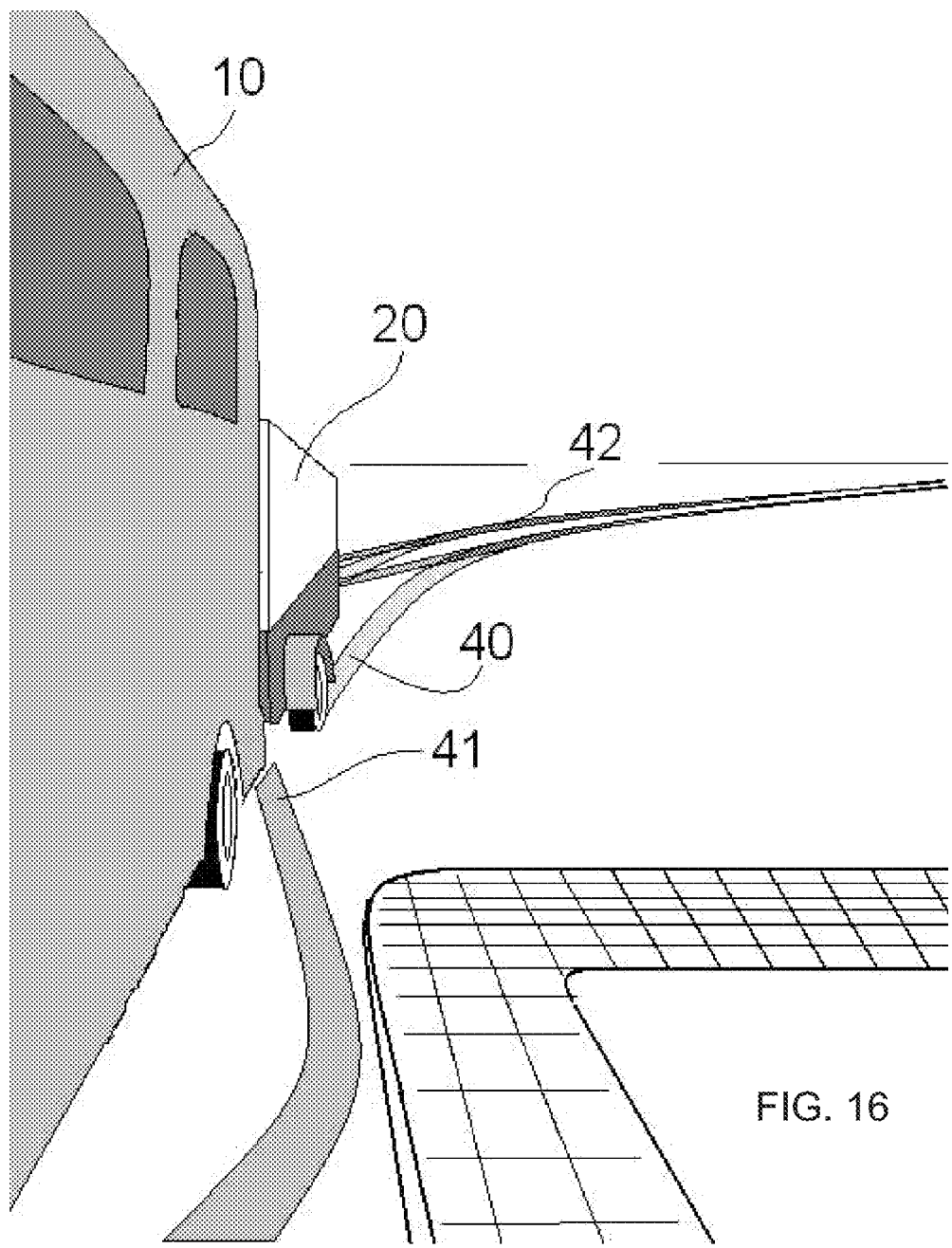
FIG. 16 is another perspective view of the side of the vehicle and trailer as in FIG. 11, showing predicted driving paths when the vehicle is backing up with the trailer.

A trailer driving aid system may use any kind of overlays to highlight a possible or ideal path that the vehicle is supposed to follow. In FIG. 15, pylons are inserted into the scenes view by overlay in the displayed images to highlight the suggested path from the system. At more progressive system setup, the system may control the steering wheel (such as by actuators or the like) in part to lead the driver into the possible or ideal path or fully for autonomous driving. FIG. 16 shows a stylized side rear view generated by image skewing and distortion with superimposed, predicted driving paths when the vehicle is backing up with a trailer. As can be seen in FIG. 16, the vehicle steering wheels firstly have to describe a curve against the desired driving direction of the trailer so later the trailer turns into about the same curvature. Though the front wheels do not scratch the pedestrian banquette.

Figure 17:
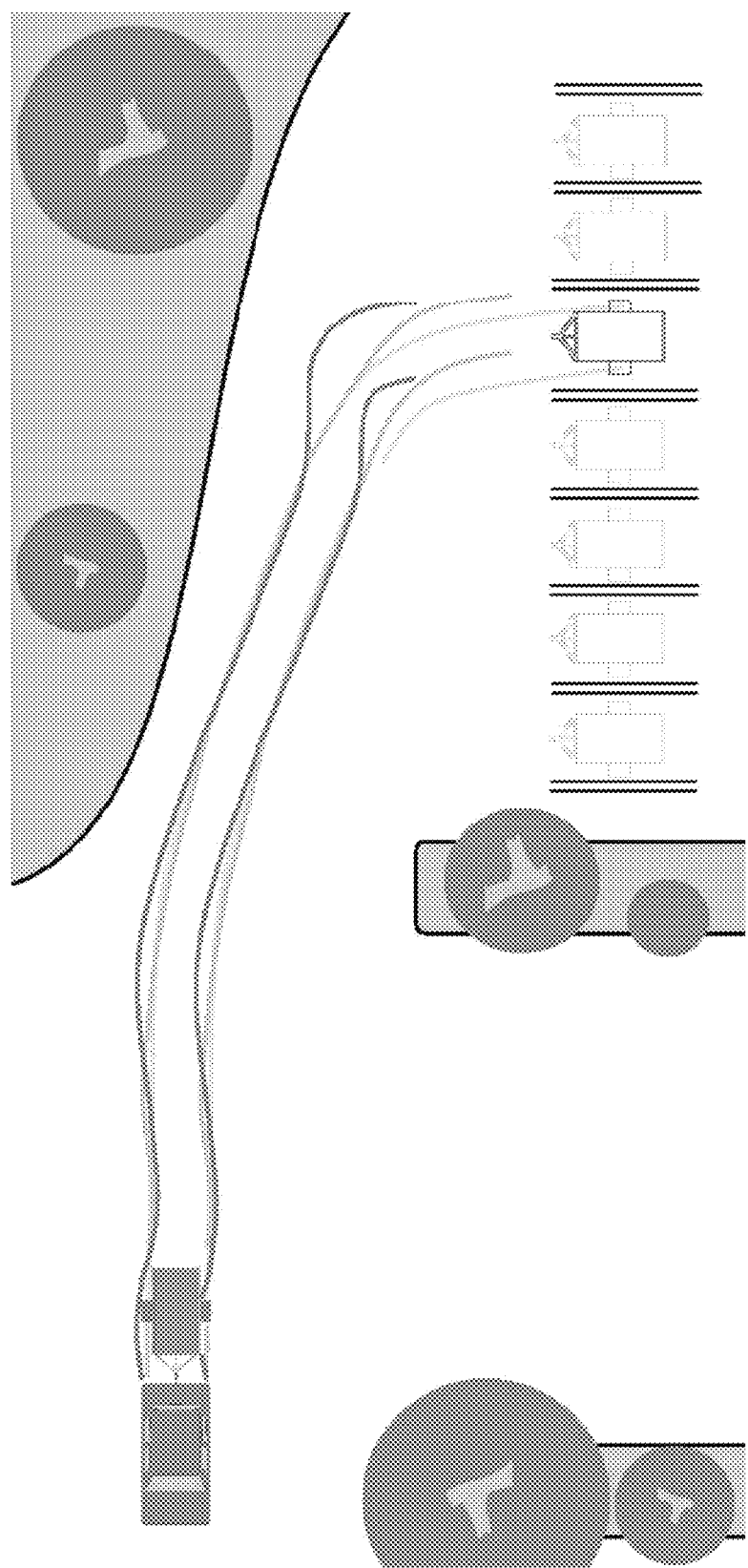
FIGS. 17-19 are plan views of parking spaces at which a vehicle may park a trailer.

An additional aspect of the present invention may be to use an augmented view which may show a scene's viewing angle which may or may not be generated by image skewing and distortion of the vehicle's on board surround view cameras but may be generatable artificially out of the three dimensional (3D) reconstruction data of the scene. The scene may be generated by adding real time captured sensor data which may cover a part of the scene which may be close and another part which may come from a record of the scene. FIG. 17 shows an example of a parking lot scene where a parking space is fully known, such that it can be shown in the augmented vision top view. The choosable or selectable parking spaces for the trailer may have been detected and the size dedicated within the 3D reconstruction. The currently chosen trailer parking position is shown in solid black, the optional parking position are shown in gray. Similar to the earlier Figures, the vehicle's front wheels' pair of predicted driving paths is shown in dark gray, the rear wheels lighter and the trailer's wheels the lightest.

Figure 18:
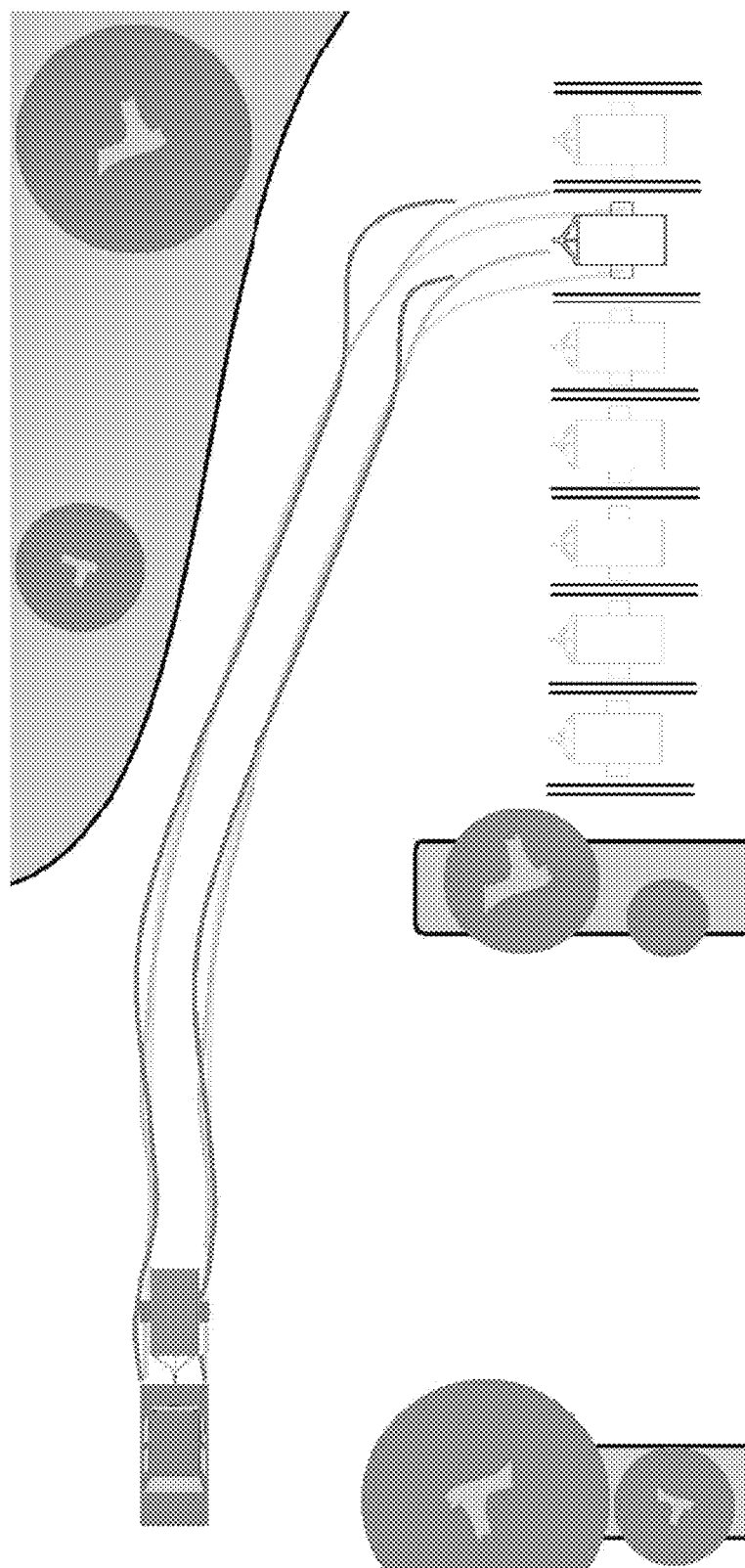
Figure 19:
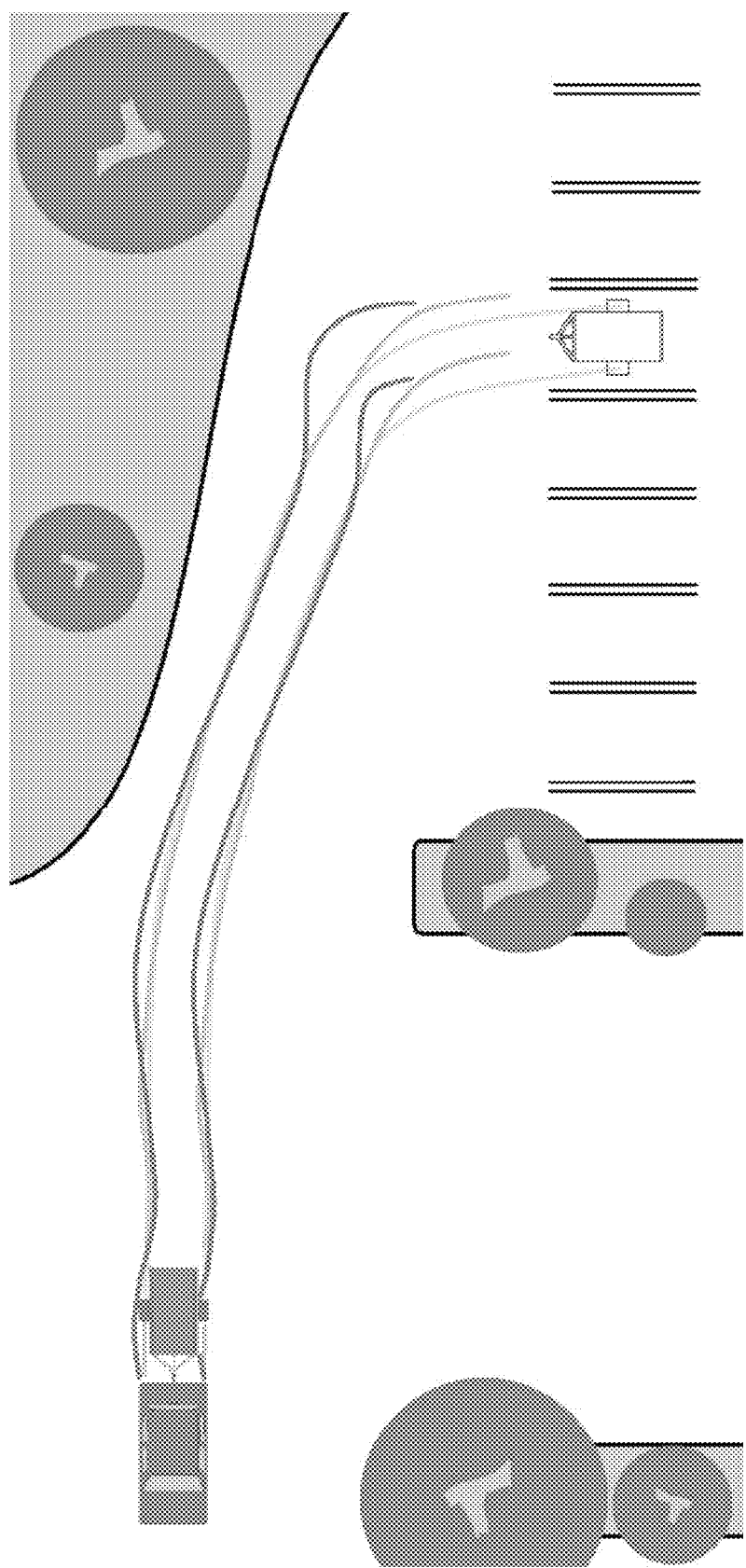
Figure 20:
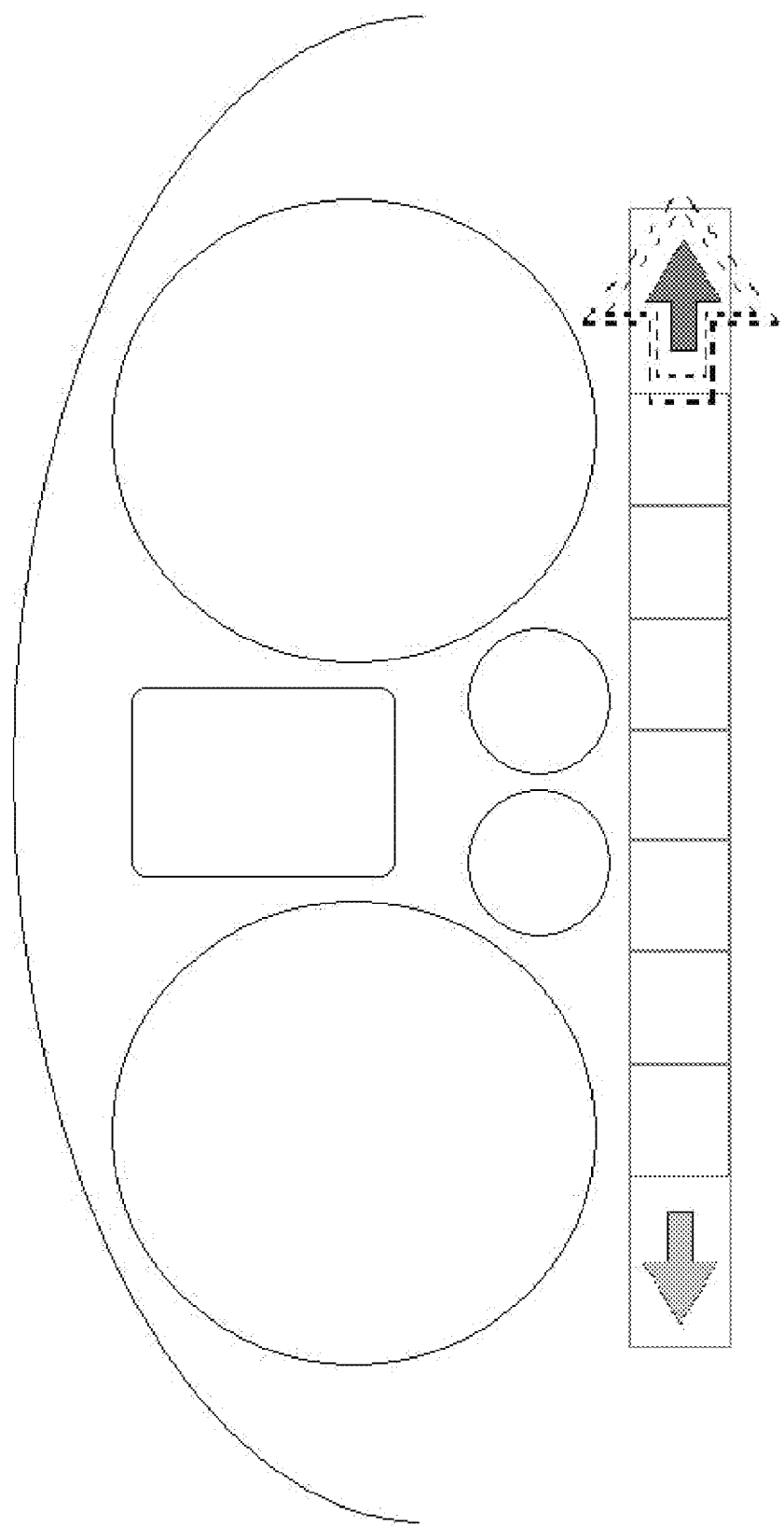
FIG. 20 is a schematic showing direction indicators that assist the driver in steering the vehicle and trailer in accordance with the present invention.

FIG. 18 shows the identical scene view with a different parking space chosen by the driver. The predicted driving path suggestion has changed accordingly. Optionally, when a trailer parking position is definitely chosen the other possible positions may be hidden or removed or disappear such as shown in FIG. 19. The driving paths may be corrected while closing to the parking space. The system may control the steering wheel (by actuators) in part or in a full manner also the brake and the accelerator. Systems without a steering wheel actuator may have a quite simple direction indicators (such as, for example, indicators such as shown in FIG. 20) for trailer pushing or pulling aid indicating to the driver the direction he or she may turn or continue to turn the steering wheel for following an suggested (ideal) driving path for maneuvering the trailer well.

Figure 21:
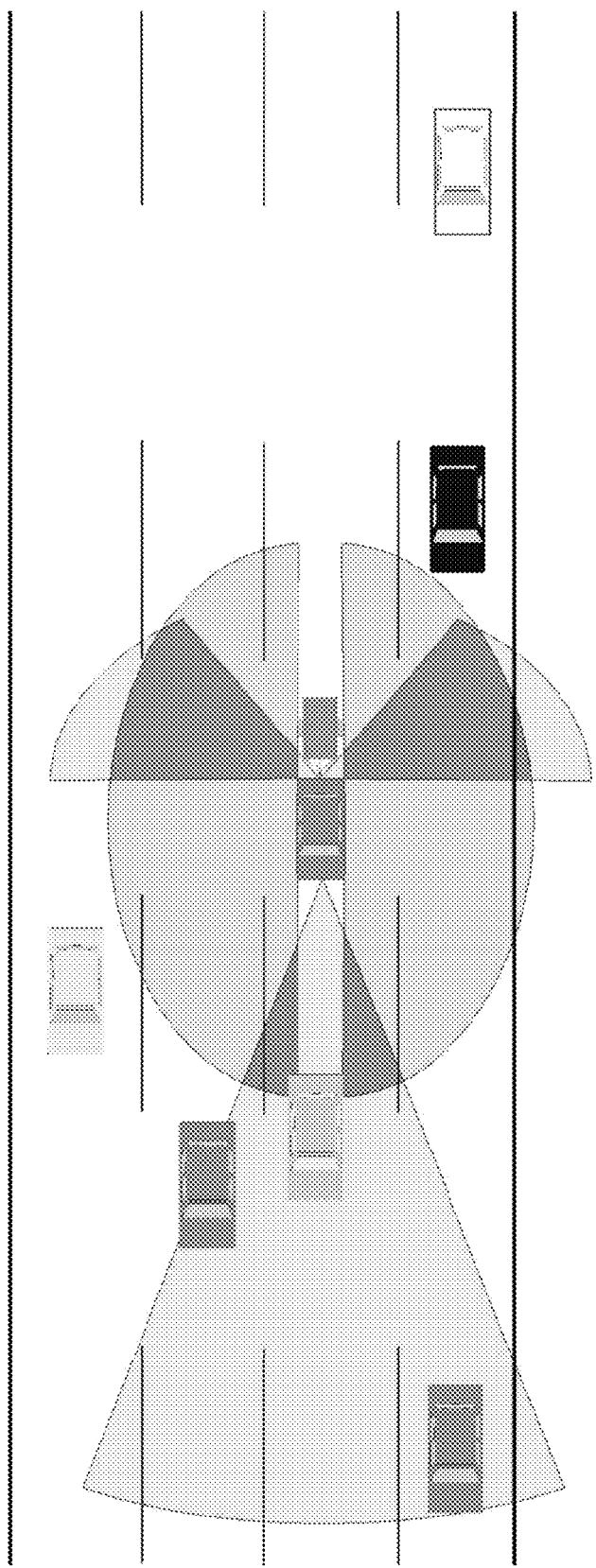
FIG. 21 is a schematic view of the vehicle camera detection ranges of the vision system of the present invention.
Figure 22:
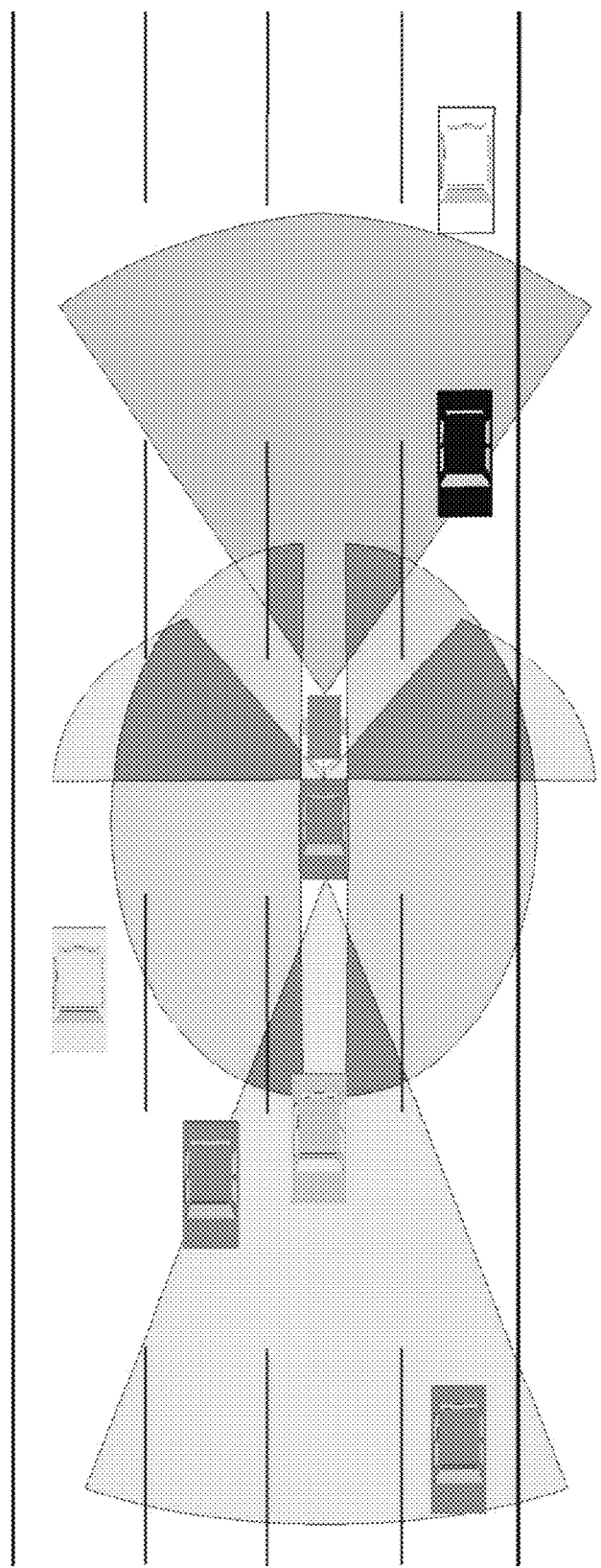
FIG. 22 is another schematic view similar to FIG. 21, showing how a trailer camera's captured images may serve to detect and warn of narrowing vehicles entering the blind spot area.

As an additional aspect to the present invention, the vehicle may have just a rear camera or a full surround view system with front, rear and side cameras. The side camera's image as like shown in FIG. 15 and/or the rear camera's image may be used for extending the (known art) vehicle blind spot detection area to the full extension of vehicle plus trailer ($l_v+l_k+l_t+l_e$) (prior unknown) plus some safety margin to aid the driver during lane changes in a way that to not just the vehicle may not interfere with other vehicles but also the pulled trailer. FIG. 21 shows a schematic view of the surround views vehicle camera detection ranges. The system may detect the black vehicle on the fast lane early enough for warning the driver that a vehicle is within the blind spot though the rear camera is partially masked by the presence of the trailer within the rear view. As mentioned earlier, the system may have an additional trailer camera attached which feeds camera image data into the vision system. The blind spot warning may benefit from that image data. The schematic of FIG. 22 shows how a trailer camera's captured image may serve to detect and warn the driver of approaching vehicles entering the blind spot area.

Optionally, and as an aid to drivers of vehicles with trailers: because we already determine the trailer's and the vehicle's weight by comparing F/at=mt versus F/av=mv, we are able to tell which driving license class is required for the specific assembly. The information may be displayed immediately after the weight of the vehicle and trailer have been determined. The according class may be selected or provided by a look up table which comes from a server or which is stored locally. The display/table may be adapted according to the nation the vehicle is driving at and/or plans to drive at (for example, when driving from Netherland to Italy with a Caravan Trailer there are four nations' caravan rules to be considered). Other nation specific rules for trailers may be stored and displayed as well. Table 1 (FIG. 24) is an example table of caravan classes valid in Germany from Jan. 19, 2013.

Therefore, the present invention provides a means for determining the trailer angle and determining a path of travel of a trailer that is towed behind a vehicle (or pushed by the vehicle, such as when the vehicle and trailer are reversing). The present invention determines the properties or characteristics of the trailer and then calculates the path of travel of the trailer. The system of the present invention may display the path of travel or proposed steering path on a display screen to indicate to the driver of the vehicle the selected or appropriate path of travel to follow with the steering wheels of the vehicle, such that the trailer follows a desired path.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (preferably a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/0145313; WO 2012/145818; WO 2012/145822; WO 2012/158167; WO 2012/075250; WO 2012/103193; WO 2012/0116043; WO 2012/0145501; WO 2012/0145343; WO 2012/154919; WO 2013/019707; WO 2013/016409; WO 2012/145822; WO 2013/067083; WO 2013/070539; WO 2013/043661; WO 2013/048994; WO 2013/063014; WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or U.S. patent applications, Ser. No. 14/082,573, filed Nov. 18, 2013; Ser. No. 14/082,574, filed Nov. 18, 2013; Ser. No. 14/082,575, filed Nov. 18, 2013; Ser. No. 14/082,577, filed Nov. 18, 2013; Ser. No. 14/071,086, filed Nov. 4, 2013; Ser. No. 14/076,524, filed Nov. 11, 2013; Ser. No. 14/052,945, filed Oct. 14, 2013; Ser. No. 14/046,174, filed Oct. 4, 2013; Ser. No. 14/016,790, filed Oct. 3, 2013; Ser. No. 14/036,723, filed Sep. 25, 2013; Ser. No. 14/016,790, filed Sep. 3, 2013; Ser. No. 14/001,272, filed Aug. 23, 2013; Ser. No. 13/970,868, filed Aug. 20, 2013; Ser. No. 13/964,134, filed Aug. 12, 2013; Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/852,190, filed Mar. 28, 2013; Ser. No. 13/851,378, filed Mar. 27, 2013; Ser. No. 13/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 61/901,127, filed Nov. 7, 2013; Ser. No. 61/905,461, filed Nov. 18, 2013; Ser. No. 61/905,462, filed Nov. 18, 2013; Ser. No. 61/895,610, filed Oct. 25, 2013; Ser. No. 61/895,609, filed Oct. 25, 2013; Ser. No. 61/893,489, filed Oct. 21, 2013; Ser. No. 61/886,883, filed Oct. 4, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/810,407, filed Apr. 10, 2013; Ser. No. 61/808,930, filed Apr. 5, 2013; Ser. No. 61/807,050, filed Apr. 1, 2013; Ser. No. 61/806,674, filed Mar. 29, 2013; Ser. No. 61/793,592, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/770,048, filed Feb. 27, 2013; Ser. No. 61/766,883, filed Feb. 20, 2013; Ser. No. 61/760,366, filed Feb. 4, 2013; Ser. No. 61/760,364, filed Feb. 4, 2013; Ser. No. 61/756,832, filed Jan. 25, 2013; Ser. No. 61/754,804, filed Jan. 21, 2013; Ser. No. 61/736,103, filed Dec. 12, 2012; Ser. No. 61/734,457, filed Dec. 7, 2012; Ser. No. 61/733,598, filed Dec. 5, 2012; and/or Ser. No. 61/733,093, filed Dec. 4, 2012, which are all hereby incorporated herein by reference in their entireties. The system may communicate with other communication systems via any suitable means, such as by utilizing aspects of the systems described in International Publication Nos.

WO/2010/144900; WO 2013/043661 and/or WO 2013/081985, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012 and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO2012/075250; WO 2013/019795; WO 2012/075250; WO 2012/145822; WO 2013/081985; WO 2013/086249; and/or WO 2013/109869, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the above description constitutes a plurality of embodiments of the present invention, it will be appreciated that the present invention is susceptible to further modification and change without departing from the fair meaning of the accompanying claims.

The invention claimed is:

1. A vehicular vision system, said vehicular vision system comprising:
   a camera disposed at a vehicle and having an exterior field of view rearward of the vehicle, wherein said camera is operable to capture image data;
   an image processor operable to process captured image data;
   wherein, when the vehicle is towing a trailer, and based at least in part on image processing of image data captured by said camera during maneuvering of the vehicle and the trailer, said image processor (i) estimates a distance between a hitching point of the trailer and an axle of the trailer, and (ii) estimates a length of the trailer that includes the estimated distance between the hitching point of the trailer and the axle of the trailer and an estimated distance between the axle of the trailer and a rear end portion of the trailer;
   wherein image data captured by said camera during maneuvering of the vehicle and the trailer includes image data captured by said camera when the vehicle is maneuvered with the trailer at an angle relative to the vehicle;
   wherein said vision system, responsive at least in part to image processing of captured image data, is operable to determine a trailer angle of the trailer that is towed by the vehicle; and
   wherein said vision system is operable to determine a path of the trailer responsive to a steering angle of the vehicle and the determined trailer angle of the trailer and the estimated length of the trailer, and wherein said vision system is operable to display information for viewing by a driver of the vehicle to assist the driver in driving the vehicle with the trailer.

2. The vehicular vision system of claim 1, wherein said vision system is operable to display images of a road in the direction of travel of the vehicle and the trailer and wherein said vision system is operable to display an overlay to indicate to the driver of the vehicle a steering path for the vehicle.

3. The vehicular vision system of claim 2, wherein said vision system displays images of a road in the forward direction of travel of the vehicle and the trailer and wherein said overlay indicates a steering path for the vehicle that tows the trailer around an obstacle.

4. The vehicular vision system of claim 2, wherein said vision system displays images of a road in the rearward direction of travel of the vehicle and the trailer and wherein said overlay indicates a steering path for the vehicle to drive the trailer into a selected location.

5. The vehicular vision system of claim 2, wherein said overlay comprises markers that indicate a determined path of travel of the front wheels of the vehicle and a path of travel that the wheels of the trailer will follow if the driver of the vehicle steers the front wheels of the vehicle along the determined path of travel of the front wheels.

6. The vehicular vision system of claim 5, wherein the determined path of travel of the front wheels of the vehicle is determined at least in part responsive to the steering angle of the vehicle.

7. The vehicular vision system of claim 1, wherein said vision system is operable to determine the trailer's width by side camera image evaluation.

8. The vehicular vision system of claim 1, wherein said vision system is operable to at least one of (a) estimate the trailer's tendency to oscillate when driving forward and (b) estimate the trailer's tendency to oscillate when driving forward and cope with that oscillation.

9. The vehicular vision system of claim 1, wherein trailer data is input into said vision system to provide data pertaining to physical characteristics of the trailer, and wherein said vision system is operable to determine the path of the trailer at least in part responsive to the trailer data.

10. The vehicular vision system of claim 1, wherein said vision system is operable to store properties of a certain trailer in a data file that is reloaded when that certain trailer is connected at the vehicle and identified by said vision system.

11. The vehicular vision system of claim 10, wherein, responsive at least in part to image processing of captured image data, said vision system is operable to identify a trailer at the vehicle via identification of a trailer code element of the trailer that is viewable by said camera.

12. The vehicular vision system of claim 11, wherein said trailer code element comprises a target having a Barker code pattern established thereon.

13. A vehicular vision system, said vehicular vision system comprising:
a camera disposed at a vehicle and having an exterior field of view rearward of the vehicle, wherein said camera is operable to capture image data;
an image processor operable to process captured image data;
wherein, when the vehicle is towing a trailer, and based at least in part on image processing of image data captured by said camera during maneuvering of the vehicle and the trailer, said image processor (i) estimates a distance between a hitching point of the trailer and an axle of the trailer, and (ii) estimates a length of the trailer that includes the estimated distance between the hitching point of the trailer and the axle of the trailer and an estimated distance between the axle of the trailer and a rear end portion of the trailer;
wherein image data captured by said camera during maneuvering of the vehicle and the trailer includes image data captured by said camera when the vehicle is maneuvered with the trailer at an angle relative to the vehicle;
wherein said vision system, responsive at least in part to image processing of captured image data, is operable to determine a trailer angle of the trailer that is towed by the vehicle;
wherein said vision system is operable to determine a path of the trailer responsive to a steering angle of the vehicle and the determined trailer angle of the trailer and the estimated length of the trailer, and wherein said vision system is operable to display information for viewing by a driver of the equipped vehicle to assist the driver in driving the vehicle with the trailer;
wherein said vision system is operable to display images of a road in the direction of travel of the vehicle and the trailer and wherein said vision system is operable to display an overlay to indicate to the driver of the vehicle a steering path for the vehicle;
wherein said overlay comprises markers that indicate a determined path of travel of the front wheels of the vehicle and a path of travel that the wheels of the trailer will follow if the driver of the vehicle steers the front wheels of the vehicle along the determined path of travel of the front wheels; and
wherein at least one of (i) said vision system displays images of a road in the forward direction of travel of the vehicle and the trailer and wherein said overlay indicates a steering path for the vehicle that tows the trailer around an obstacle and (ii) said vision system displays images of a road in the rearward direction of travel of the vehicle and the trailer and wherein said overlay indicates a steering path for the vehicle to drive the trailer into a selected location.

14. The vehicular vision system of claim 13, wherein said vision system is operable to determine the trailer's width by side camera image evaluation.

15. The vehicular vision system of claim 13, wherein said vision system is operable to at least one of (a) estimate the trailer's tendency to oscillate when driving forward and (b) estimate the trailer's tendency to oscillate when driving forward and cope with that oscillation.

16. The vehicular vision system of claim 13, wherein trailer data is input into said vision system to provide data pertaining to physical characteristics of the trailer, and wherein said vision system is operable to determine the path of the trailer at least in part responsive to the trailer data.

17. The vehicular vision system of claim 16, wherein said vision system is operable to store properties of a certain trailer in a data file that is reloaded when that certain trailer is connected at the vehicle and identified by said vision system, and wherein, responsive at least in part to image processing of captured image data, said vision system is operable to identify the trailer at the vehicle via identification of a trailer code element of the trailer that is viewable by said camera, and wherein said trailer code element comprises a target having a coded pattern established thereon.

18. A vehicular vision system, said vehicular vision system comprising:
a camera disposed at a vehicle and having an exterior field of view rearward of the vehicle, wherein said camera is operable to capture image data;
an image processor operable to process captured image data;
wherein, when the vehicle is towing a trailer, and based at least in part on image processing of image data captured by said camera during maneuvering of the vehicle and the trailer, said image processor (i) estimates a distance between a hitching point of the trailer and an axle of the trailer, and (ii) estimates a length of the trailer that includes the estimated distance between the hitching point of the trailer and the axle of the trailer and an estimated distance between the axle of the trailer and a rear end portion of the trailer;
wherein image data captured by said camera during maneuvering of the vehicle and the trailer includes image data captured by said camera when the vehicle is maneuvered with the trailer at an angle relative to the vehicle;
wherein said vision system, responsive at least in part to image processing of captured image data, is operable to determine a trailer angle of the trailer that is towed by the vehicle;

wherein said vision system is operable to determine a path of the trailer responsive to a steering angle of the vehicle and the determined trailer angle of the trailer and the estimated length of the trailer, and wherein said vision system is operable to display information for viewing by a driver of the vehicle to assist the driver in driving the vehicle with the trailer;

wherein, responsive at least in part to image processing of captured image data, said vision system is operable to identify the trailer at the vehicle via identification of a trailer code element of the trailer that is viewable by said camera;

wherein trailer data is input into said vision system to provide data pertaining to physical characteristics of multiple trailers and wherein trailer data for a particular trailer is accessed when that particular trailer is connected at the vehicle and identified by said vision system; and wherein said vision system is operable to determine the path of the trailer at least in part responsive to the trailer data for the identified trailer.

19. The vehicular vision system of claim 18, wherein said vision system is operable to display images of a road in the direction of travel of the vehicle and the trailer, and wherein said vision system is operable to display an overlay to indicate to the driver of the vehicle a steering path for the vehicle, and wherein said overlay comprises markers that indicate a determined path of travel of the front wheels of the vehicle and a path of travel that the wheels of the trailer will follow if the driver of the vehicle steers the front wheels of the vehicle along the determined path of travel of the front wheels.

20. The vehicular vision system of claim 18, wherein said trailer code element comprises a target having a coded pattern established thereon.

* * * * *